(12) United States Patent
Suzuki

(10) Patent No.: US 11,979,535 B2
(45) Date of Patent: May 7, 2024

(54) IMAGE READING APPARATUS, IMAGE READING METHOD, AND IMAGE READING PROGRAM

(71) Applicant: Konica Minolta, Inc., Tokyo (JP)

(72) Inventor: Hiroyuki Suzuki, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/226,298

(22) Filed: Jul. 26, 2023

(65) Prior Publication Data

US 2024/0056539 A1 Feb. 15, 2024

(30) Foreign Application Priority Data

Aug. 10, 2022 (JP) ................................. 2022-127880

(51) Int. Cl.
*H04N 1/04* (2006.01)
*H04N 1/00* (2006.01)
*H04N 1/028* (2006.01)

(52) U.S. Cl.
CPC ....... *H04N 1/0423* (2013.01); *H04N 1/00803* (2013.01); *H04N 1/02895* (2013.01); *H04N 2201/0081* (2013.01)

(58) Field of Classification Search
CPC ............. H04N 1/0423; H04N 1/02895; H04N 2201/0081
See application file for complete search history.

(56) References Cited

U.S. PATENT DOCUMENTS

| 2003/0128405 A1* | 7/2003 | Tay .......................... H04N 1/40 348/E9.037 |
| 2003/0193699 A1* | 10/2003 | Tay .................... H04N 1/32358 348/E9.037 |
| 2005/0212718 A1* | 9/2005 | Nabeshima ............. G06T 3/403 345/3.3 |
| 2007/0040100 A1* | 2/2007 | Zarnowski ........... H04N 25/701 348/E3.027 |
| 2008/0131028 A1* | 6/2008 | Pillman ................ H04N 25/133 348/E5.041 |
| 2015/0116794 A1* | 4/2015 | Nakazawa ............. H04N 1/193 358/482 |
| 2017/0289386 A1* | 10/2017 | Akagi .................... H04N 1/191 |

(Continued)

FOREIGN PATENT DOCUMENTS

| JP | 2009-171563 A | 7/2009 |
| JP | 2016-131265 A | 7/2016 |

(Continued)

*Primary Examiner* — Ted W Barnes
(74) *Attorney, Agent, or Firm* — RANKIN, HILL & CLARK LLP

(57) ABSTRACT

An image reading apparatus includes: a reader that performs first reading of reading a document and second reading of reading a portion read through a first color in the first reading through a second color using an area sensor having a Bayer arrangement color filter; a generator that generates first image data represented by a plurality of adjacent pixels with a read value obtained through one Bayer arrangement in the first reading as one pixel, and generates second image data using, for each reading position, a value read through the first color in the first reading and a value read through the second color in the second reading; and a selector that selects one of the first image data or the second image data.

16 Claims, 22 Drawing Sheets

(56) References Cited

U.S. PATENT DOCUMENTS

2018/0150937 A1* 5/2018 Tang .................... H04N 25/134
2020/0126200 A1* 4/2020 Sano .................... H04N 1/4092
2021/0392303 A1* 12/2021 Park ..................... G06T 3/4015

FOREIGN PATENT DOCUMENTS

| JP | 2016131265 A | * | 7/2016 | |
| JP | 2020065210 A | * | 4/2020 | ........... G06T 11/001 |
| WO | WO-0072262 A1 | * | 11/2000 | ............ B41J 11/008 |

* cited by examiner

FIG. 9A

| (1, 1) | (1, 2) | (1, 3) | (1, 4) | (1, 5) | (1, 6) | (1, 7) | (1, 8) |
|---|---|---|---|---|---|---|---|
| (2, 1) | (2, 2) | (2, 3) | (2, 4) | (2, 5) | (2, 6) | (2, 7) | (2, 8) |
| (3, 1) | (3, 2) | (3, 3) | (3, 4) | (3, 5) | (3, 6) | (3, 7) | (3, 8) |
| (4, 1) | (4, 2) | (4, 3) | (4, 4) | (4, 5) | (4, 6) | (4, 7) | (4, 8) |
| (5, 1) | (5, 2) | (5, 3) | (5, 4) | (5, 5) | (5, 6) | (5, 7) | (5, 8) |
| (6, 1) | (6, 2) | (6, 3) | (6, 4) | (6, 5) | (6, 6) | (6, 7) | (6, 8) |
|  |  |  |  |  |  |  |  |

FIG. 9B

| $R_{11}$ | $G_{12}$ | $R_{13}$ | $G_{14}$ | $R_{15}$ | $G_{16}$ | $R_{17}$ | $G_{18}$ |
|---|---|---|---|---|---|---|---|
| $G_{21}$ | $B_{22}$ | $G_{23}$ | $B_{24}$ | $G_{25}$ | $B_{26}$ | $G_{27}$ | $B_{28}$ |
| $R_{31}$ | $G_{32}$ | $R_{33}$ | $G_{34}$ | $R_{35}$ | $G_{36}$ | $R_{37}$ | $G_{38}$ |
| $G_{41}$ | $B_{42}$ | $G_{43}$ | $B_{44}$ | $G_{45}$ | $B_{46}$ | $G_{47}$ | $B_{48}$ |
| $R_{51}$ | $G_{52}$ | $R_{53}$ | $G_{54}$ | $R_{55}$ | $G_{56}$ | $R_{57}$ | $G_{58}$ |
|  |  |  |  |  |  |  |  |

FIG. 9C

| (2, 1) | (2, 2) | (2, 3) | (2, 4) | (2, 5) | (2, 6) | (2, 7) | (2, 8) |
|---|---|---|---|---|---|---|---|
| (3, 1) | (3, 2) | (3, 3) | (3, 4) | (3, 5) | (3, 6) | (3, 7) | (3, 8) |
| (4, 1) | (4, 2) | (4, 3) | (4, 4) | (4, 5) | (4, 6) | (4, 7) | (4, 8) |
| (5, 1) | (5, 2) | (5, 3) | (5, 4) | (5, 5) | (5, 6) | (5, 7) | (5, 8) |
| (6, 1) | (6, 2) | (6, 3) | (6, 4) | (6, 5) | (6, 6) | (6, 7) | (6, 8) |
|  |  |  |  |  |  |  |  |

FIG. 9D

| $R_{11}$ | $G_{12}$ | $R_{13}$ | $G_{14}$ | $R_{15}$ | $G_{16}$ | $R_{17}$ | $G_{18}$ |
|---|---|---|---|---|---|---|---|
| $G_{21}$ | $B_{22}$ | $G_{23}$ | $B_{24}$ | $G_{25}$ | $B_{26}$ | $G_{27}$ | $B_{28}$ |
| $R_{31}$ | $G_{32}$ | $R_{33}$ | $G_{34}$ | $R_{35}$ | $G_{36}$ | $R_{37}$ | $G_{38}$ |
| $G_{41}$ | $B_{42}$ | $G_{43}$ | $B_{44}$ | $G_{45}$ | $B_{46}$ | $G_{47}$ | $B_{48}$ |
| $R_{51}$ | $G_{52}$ | $R_{53}$ | $G_{54}$ | $R_{55}$ | $G_{56}$ | $R_{57}$ | $G_{58}$ |
|  |  |  |  |  |  |  |  |

FIG. 9E $$\begin{cases} (r21, g21, b21) = (\text{AMOUNT OF RECEIVED LIGHT OF } R_{11},\ \text{AMOUNT OF RECEIVED LIGHT OF } G_{21},\ \dfrac{B_{22}+B_{24}}{2}) \\ (r22, g22, b22) = (\dfrac{R_{11}+R_{13}}{2},\ \text{AMOUNT OF RECEIVED LIGHT OF } G_{12},\ \text{AMOUNT OF RECEIVED LIGHT OF } B_{22}) \\ (r31, g31, b31) = (\text{AMOUNT OF RECEIVED LIGHT OF } R_{31},\ \text{AMOUNT OF RECEIVED LIGHT OF } G_{21},\ \dfrac{B_{22}+B_{24}}{2}) \\ (r32, g32, b32) = (\dfrac{R_{31}+R_{33}}{2},\ \text{AMOUNT OF RECEIVED LIGHT OF } G_{32},\ \text{AMOUNT OF RECEIVED LIGHT OF } B_{22}) \end{cases}$$

FIG. 13
CHARACTER OF 600dpi×600dpi
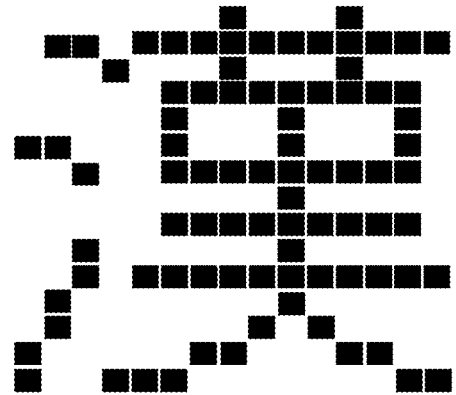
CHARACTER OF 1200dpi×1200dpi
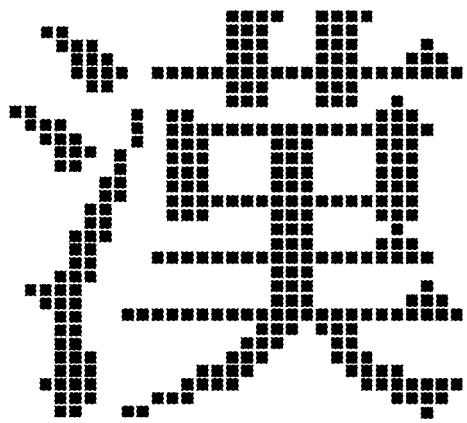

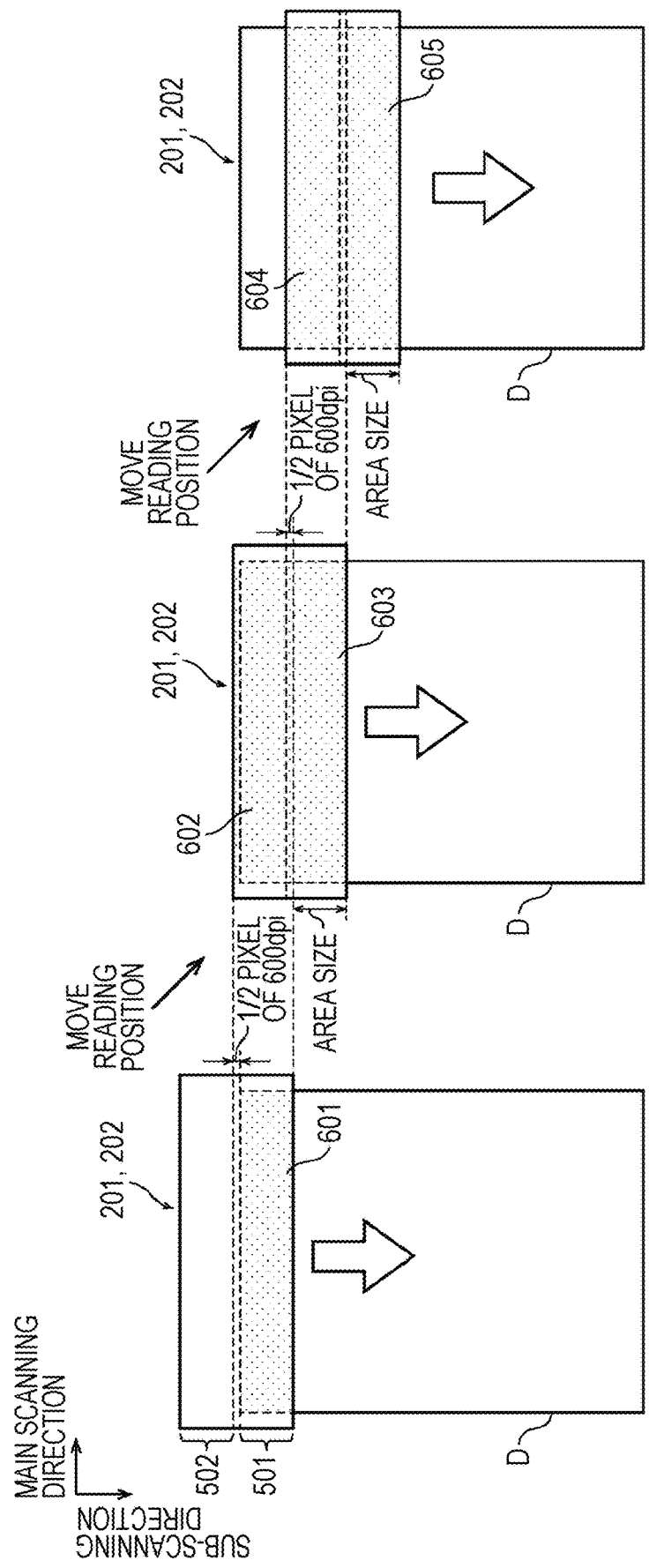

FIG. 18C

EXAMPLE OF R COMBINED IMAGE DATA (600dpi×1200dpi)

EXAMPLE OF G COMBINED IMAGE DATA (1200dpi×1200dpi)

EXAMPLE OF B COMBINED IMAGE DATA (600dpi×1200dpi)

IMAGE READING APPARATUS, IMAGE READING METHOD, AND IMAGE READING PROGRAM

The entire disclosure of Japanese patent Application No. 2022-127880, filed on Aug. 10, 2022, is incorporated herein by reference in its entirety.

BACKGROUND

Technological Field

The present disclosure relates to an image reading apparatus, an image reading method, and an image reading program that use an area sensor to read a document.

Description of the Related Art

As an image reading apparatus using an area sensor to read a document, the image reading apparatus described in Japanese Patent Application Laid-Open No. 2009-171563 (hereinafter, JP 2009-171563 A) is known. An area sensor 701 illustrated in FIG. 19 includes line sensors 704 and 705. Since the line sensors 704 and 705 are arranged at a distance in a sub-scanning direction (paragraph 0069), when a read operation is performed using these line sensors, two pieces of frame image data 714 and 715 whose phases are shifted in the sub-scanning direction are obtained by a single read operation. A document is scanned using the plurality of line sensors to obtain the frame image data 714 and 715, and super-resolution processing is performed using the frame image data 714 and 715 obtained by the read operation. In this way, the conventional image reading apparatus can generate high-resolution image data 724 based on a selection of an output resolution by a user.

Meanwhile, in the image reading apparatus described in JP 2009-171563 A, a value obtained by weighting and averaging data values of peripheral pixels in super-resolution processing is set as a pixel value of high-resolution image data. In such a weighted average method, since the pixels of the high-resolution image data have smooth values, the image reading apparatus described in JP 2009-171563 A has a problem of poor definition even if the high-resolution image data is generated.

In addition, the use of the high-resolution image data may cause various disadvantages. For example, when the high-resolution image data is used for image editing by an image editing application, it is difficult to operate the high-resolution image data because the high-resolution image data is displayed as a large-sized image. In addition, since a large area is occupied on the memory, operations of the image editing application become unstable, and processing is delayed. The image reading apparatus described in JP 2009-171563 A only creates high-resolution image data with a resolution designated by a user, and thus has a problem that the convenience of the user is not sufficiently considered.

SUMMARY

An object of the present disclosure is to provide an image reading apparatus, an image reading method, and an image reading program capable of generating fine image data and avoiding various adverse effects caused by high-resolution image data.

To achieve the abovementioned object, according to an aspect of the present invention, an image reading apparatus reflecting one aspect of the present invention comprises: a reader that performs first reading of reading a document and second reading of reading a portion read through a first color in the first reading through a second color using an area sensor having a Bayer arrangement color filter; a generator that generates first image data represented by a plurality of adjacent pixels with a read value obtained through one Bayer arrangement in the first reading as one pixel, and generates second image data using, for each reading position, a value read through the first color in the first reading and a value read through the second color in the second reading; and a selector that selects one of the first image data or the second image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9A illustrates a matrix area obtained by dividing a document to be read with a resolution of 1200 dpi×1200 dpi;

FIG. 9B illustrates light receiving elements in 5 rows×8 columns arranged in a matrix; FIG. 9C illustrates a state where the area sensor is shifted in a sub-scanning direction from the position illustrated in FIG. 9A;

FIG. 9D illustrates the light receiving elements in 5 rows×8 columns arranged in a matrix in a shifted state; FIG. 9E shows a process of writing in a third image memory;

FIG. 13 shows comparison between a character of 600 dpi×600 dpi observed image data and a character of 1200 dpi×1200 dpi mosaic image data;

FIG. 17A is a diagram illustrating a first reading position on the document;

FIG. 17B is a diagram illustrating a second reading position on the document;

FIG. 17C is a diagram illustrating a third reading position on the document;

FIG. 18C is a diagram illustrating combined image data of each read color; and

DETAILED DESCRIPTION OF EMBODIMENTS

Hereinafter, one or more embodiments of an image reading apparatus according to the present invention will be described with reference to the drawings, taking a multi-function peripheral (M P) with an image reading function as an example. However, the scope of the invention is not limited to the disclosed embodiments.

[1] Configuration of Multi-Function Peripheral 1

Figure 1:
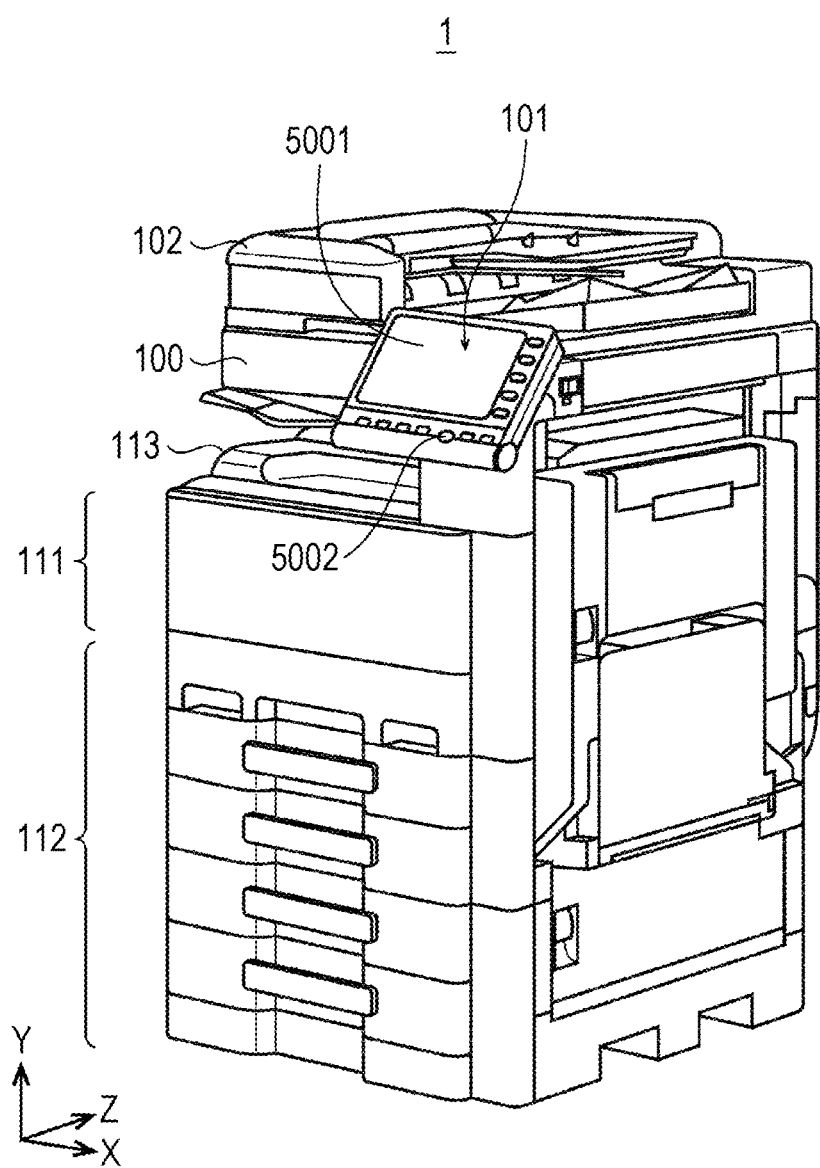
FIG. 1 is an external perspective view illustrating a main configuration of a multi-function peripheral according to an embodiment of the present disclosure.

The multi-function peripheral 1 according to the present embodiment has a plurality of functions such as an image reading function, a copying function, a facsimile function, a network function, and a BOX function, and includes an image reader 100, an operation receiving unit 101, an automatic document feeder (ADF) 102, an image forming unit 111, and a sheet feeder 112 as illustrated in FIG. 1.

The image reader 100 optically reads a document by a sheet-through method or a platen-set method to generate image data. The automatic document feeder 102 causes the image reader 100 to read documents while conveying the documents one by one from a document bundle in a case where the documents are read by the sheet-through method. In the case of the platen-set method, the image reader 100 reads a document placed on a platen glass.

When the document is read by either the sheet-through method or the platen-set method, the image reader 100 generates image data with a resolution of 600 dpi×600 dpi and image data with a resolution of 1200 dpi×1200 dpi.

Figure 2:
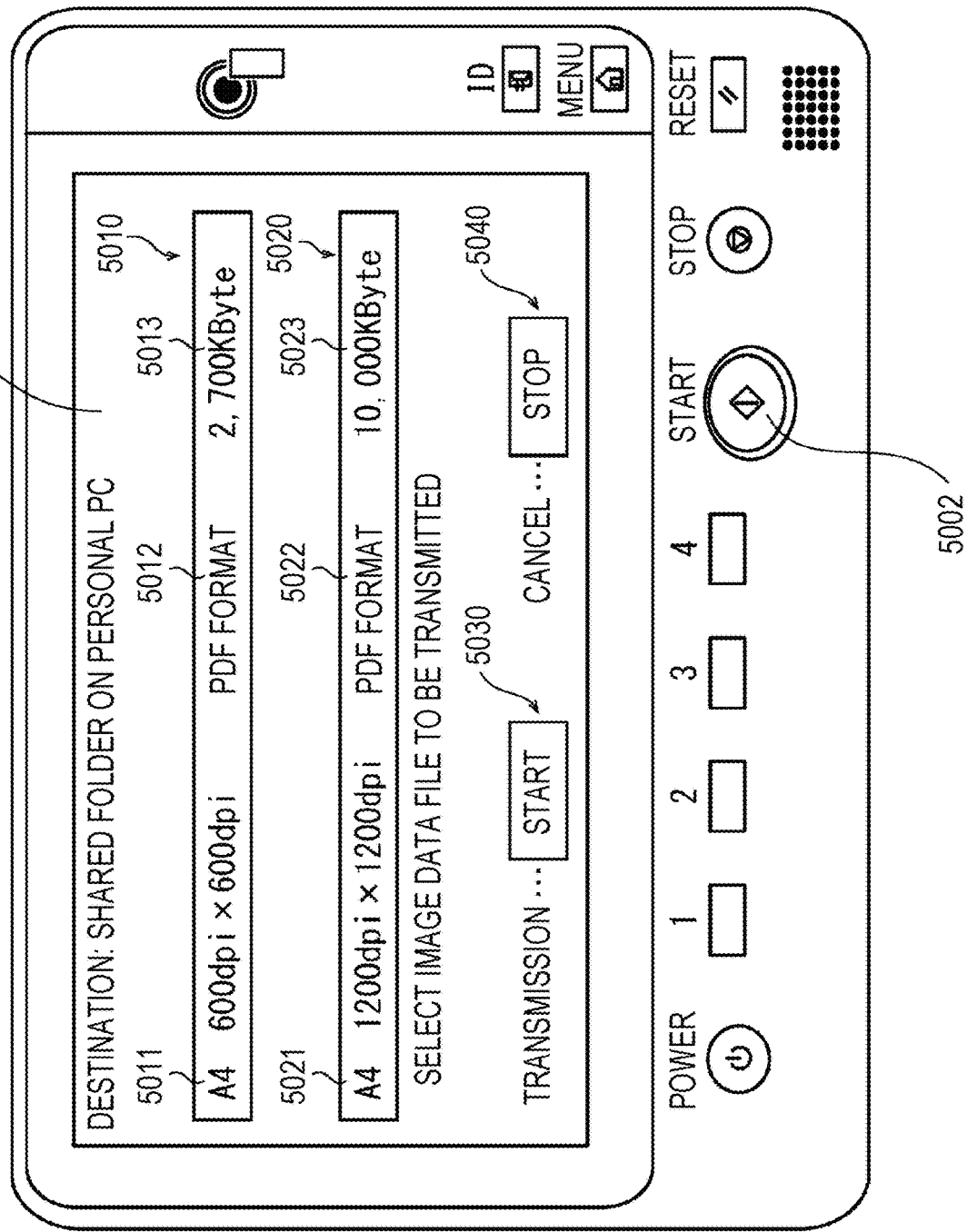
FIG. 2 illustrates an example of an operation screen for receiving an operation of selecting image data with a resolution of 600 dpi×600 dpi or image data with a resolution of 1200 dpi×1200 dpi.

As illustrated in FIG. 2, the operation receiving unit 101 includes a touch panel 5001, a start key 5002, a speaker, a light emitting diode (LED), and the like, displays setting items necessary for reading documents on the touch panel 5001, and receives an input of the setting items. The setting items necessary for reading documents include a destination of image data obtained by reading, a distinction between double-sided reading and single-sided reading, a file format, a read size, and the presence or absence of continuous reading. A particularly important setting item is a document type. The document type indicates the type of a document to be read. In the present embodiment, the distinction between a character mode, a photograph mode, and a character/photograph mode designated by an operation of setting a document image quality is defined as the document type. In the character/photograph mode, a character area and a photograph area are arranged in a free layout, and it is required to extract the character area. Characters are symbols formed using visible lines (straight lines and curves) and points in order to visually record and transmit words and languages, and include not only characters, numbers, and the like in languages of different countries but also mathematical expressions, graphical symbols, and the like.

In the multi-function peripheral 1 of the present embodiment, when setting items are input, the image reader 100 reads a document, and image data with a resolution of 600 dpi×600 dpi and image data with a resolution of 1200 dpi×1200 dpi are generated by the image reader 100, the multi-function peripheral displays a screen prompting a user to select image data to be used among the image data with a resolution of 600 dpi×600 dpi and the image data with a resolution of 1200 dpi×1200 dpi.

FIG. 2 illustrates an example of the operation screen. The operation screen includes a button 5010 for receiving a selection of 600 dpi×600 dpi image data and a button 5020 for receiving a selection of 1200 dpi×1200 dpi image data, and is configured to be able to select which of the 600 dpi×600 dpi image data and the 1200 dpi×1200 dpi image data is to be transmitted to a set destination.

The 600 dpi×600 dpi image selection button 5010 includes a document size display 5011, a file format display 5012, and a data size display 5013, and the 1200 dpi×1200 dpi image selection button 5020 includes a document size display 5021, a file format display 5022, and a data size display 5023. By referring to these data size displays, it is possible to determine which image data is to be selected.

The image forming unit 111 forms an image on a recording sheet using the image data generated by the image reader 100 or the image data designated by the user.

The sheet feeder 112 includes a plurality of sheet feeding trays, and can store different types of recording sheets in different sheet feeding trays. The sheet feeder 112 supplies a recording sheet designated by the user to the image forming unit 111. When forming an image, the image forming unit 111 ejects the recording sheet onto a sheet ejection tray 113.

[2] Configuration of Image Reader 100

Figure 3:
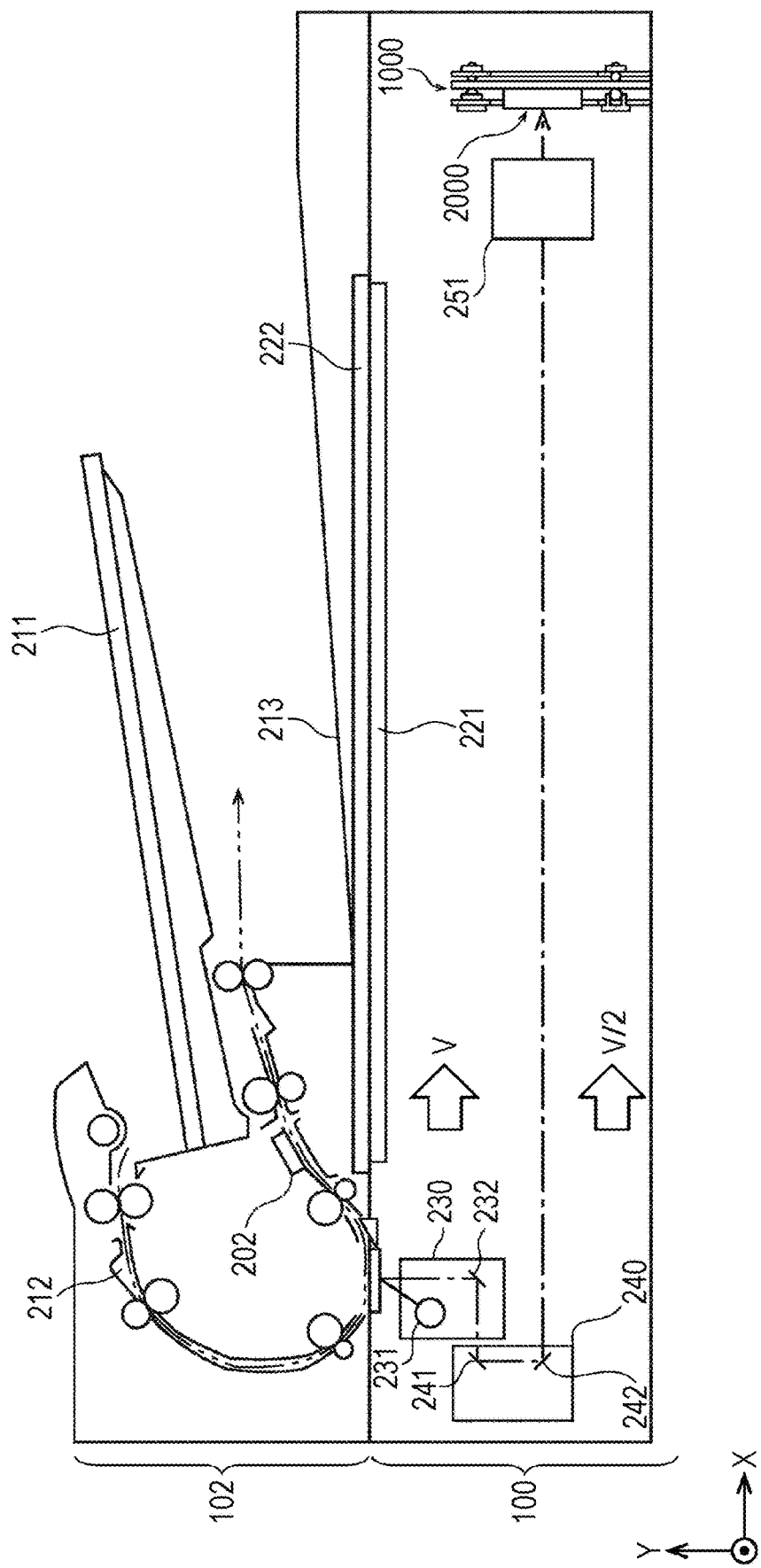
FIG. 3 is a cross-sectional perspective view illustrating main configurations of an image reader and an automatic document feeder for reading a document by a sheet-through method and a platen-set method.

In a case where the document is read by the sheet-through method, as illustrated in FIG. 3, the automatic document feeder 102 feeds documents one by one from the uppermost position of a document bundle placed on a document tray 211, and causes the image reader 100 to read the documents while conveying the documents along a document conveying path 212. The image reader 100 reads the surface of the document using an area sensor 2000, which is a CMOS sensor. In a case where the back surface of the document is also read, the image reader 100 uses a contact image sensor (CIS) 202. Note that it is not limited to a CMOS sensor and a CIS, and other optical sensors can be used. The read documents are sequentially ejected onto a sheet ejection tray 213.

In a case where the document is read by the platen-set method, a document D (FIG. 4) is placed on the platen glass 221. The automatic document feeder 102 also functions as a document cover, and presses the document D against the platen glass 221 using a white plate 222. The image reader 100 includes a first mirror unit 230 and a second mirror unit 240. By being driven by a document scanner motor 252, the first mirror unit 230 can move from a home position illustrated in the drawing at a velocity V in a sub-scanning direction along the reading surface of the document D.

Similarly, by being driven by the document scanner motor 252, the second mirror unit 240 can move from the home position at a velocity V/2 in the sub-scanning direction along the reading surface. The first mirror unit 230 and the second mirror unit 240 start to move from the home position when reading the document D.

The first mirror unit 230 includes a document illumination lamp 231 and a first mirror 232. The document illumination lamp 231 illuminates a reading area on the reading surface of the document D. The first mirror 232 reflects the reflected light from the reading area and guides the reflected light to the second mirror unit 240. The second mirror unit 240 includes a second mirror 241 and a third mirror 242. The second mirror 241 reflects the reflected light guided by the first mirror 232 and guides the reflected light to the third mirror 242. The third mirror 242 reflects the light from the second mirror 241 and guides the light to a lens 251.

The lens 251 focuses the light from the third mirror 242 and causes the light to be incident on the area sensor 2000. The image reader 100 causes the reflected light from the reading area to be incident on the area sensor 2000 while moving the first mirror unit 230 and the second mirror unit 240, thereby reading the document D by the platen-set method.

In a case where the document D is read by the sheet-through method, the first mirror unit 230 is moved in such a manner that the first mirror 232 of the first mirror unit 230 is located at a home position immediately below the reading position of the document D. The second mirror unit 240 is moved accordingly.

Figure 4:
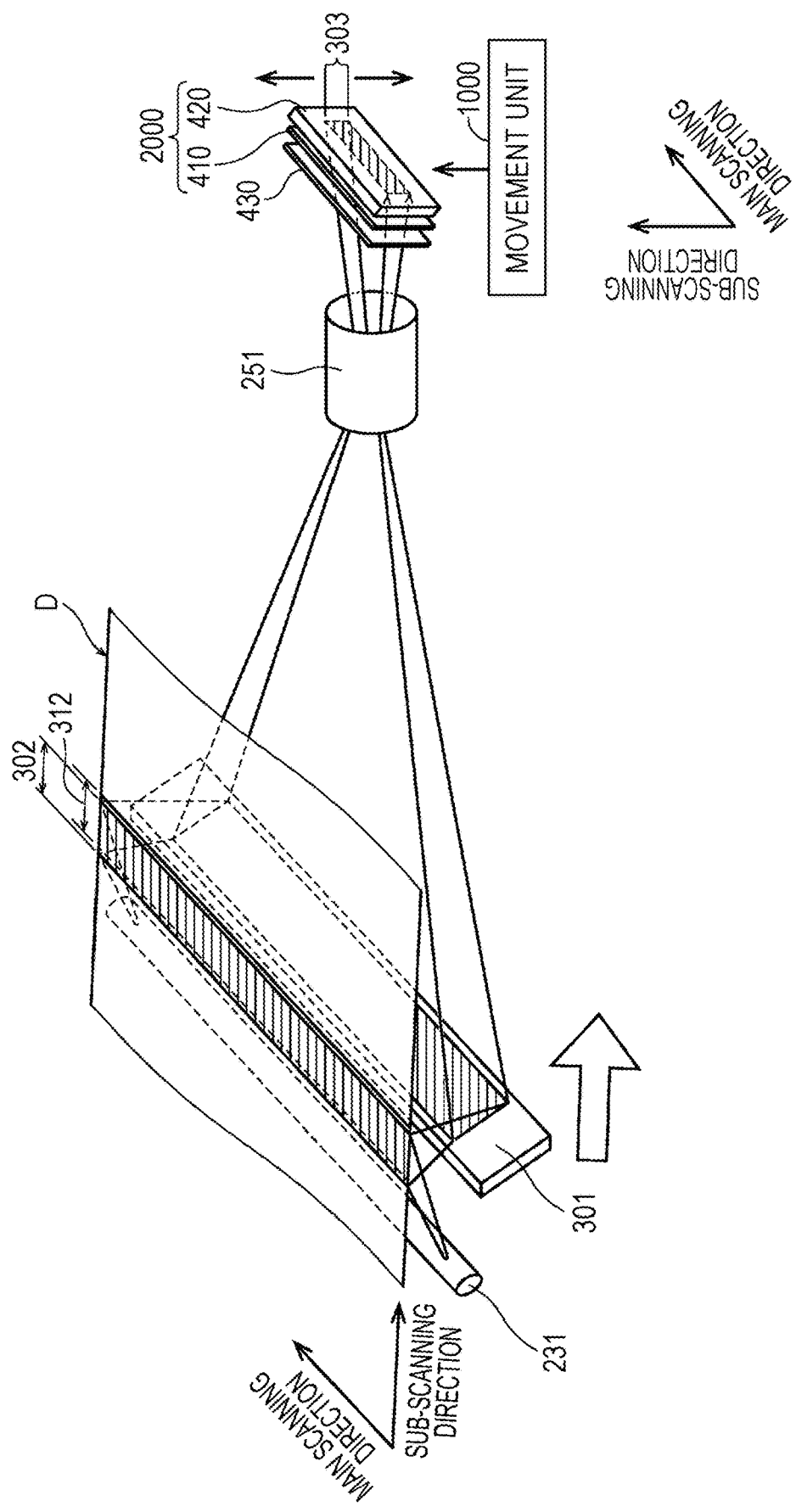
FIG. 4 is a perspective view schematically illustrating an optical path through which reflected light from a reading area on the document is incident on a light receiving area of an area sensor when the document is read by the platen-set method.

FIG. 4 is a perspective view illustrating only an optical system out of the components illustrated in FIG. 3. As illustrated in FIG. 4, by a reflective optical system 301 including the first mirror unit 230 and the second mirror unit 240 moving in the sub-scanning direction, a reading area 302 on the reading surface of the document D also moves in the sub-scanning direction. The reflected light from the reading area 302 is incident on a predetermined area 303 of the area sensor 2000 via the lens 251 regardless of the positions of the reflective optical system 301 and the reading area 302 in the sub-scanning direction.

The area sensor 2000 is supported by a movement unit 1000 so as to be movable in a Y-axis direction. Hereinafter, configurations of the area sensor 2000 and the movement unit 1000 will be described with reference to FIGS. 5 and 6.

[3] Area Sensor 2000

Figure 5:
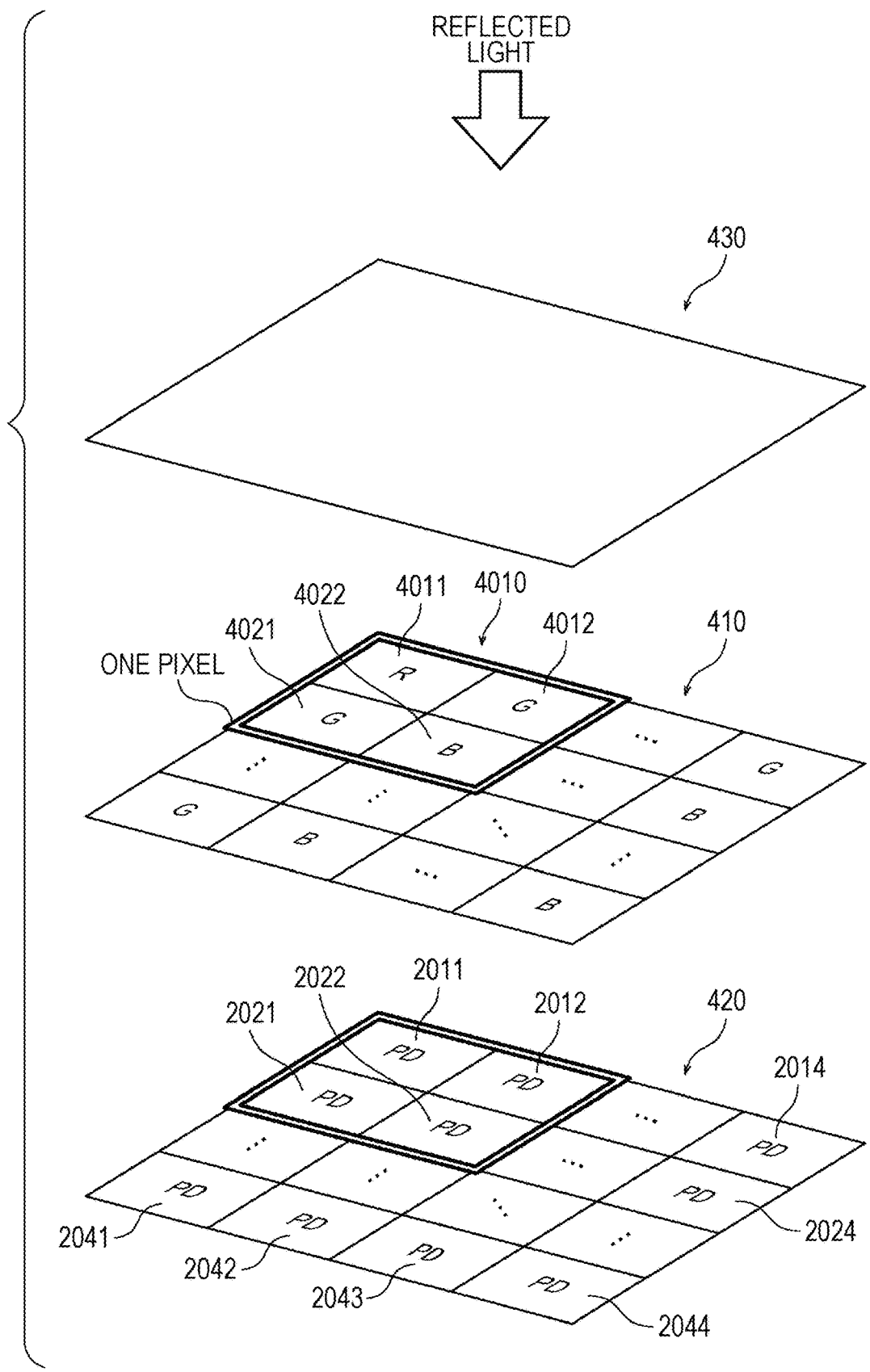
FIG. 5 is an exploded perspective view illustrating a main configuration of the area sensor.

As illustrated in FIG. 5, the area sensor 2000 includes a color filter 410 and an integrated circuit 420. The reflected light from the document D is incident on light receiving elements (PD) of the integrated circuit 420 via the color filter 410.

A shutter device 430 such as a liquid crystal shutter is disposed on the optical path of incident light from the document D to the color filter 410, and is opened and closed based on the read timing of the area sensor (the movement state of the reading position). When the shutter device 430 is opened at each read timing, the reflected light from the document D is incident on the light receiving unit PD of the integrated circuit 420, and the amount of received incident light is detected for each light receiving element.

As illustrated in FIG. 5, the color filter 410 includes a plurality of Bayer arrangements 4010. The Bayer arrangement 4010 is a square array of an R window 4011, a G window 4012, a G window 4021, and a B window 4022, and the G windows 4012 and 4021 are arranged at diagonal positions in the square array. Each window allows only light with a wavelength of a corresponding color component to pass therethrough, and band-limits the color of light incident on each light receiving element 2011, 2012, 2013 . . . of the integrated circuit 420 to any one of red (R), green (G), and blue (B). In the color filter, the distance between the center of the window portion of one color and the center of the adjacent window portion of another color is referred to as "inter-color pitch", and the area sensor 2000 is moved by this inter-color pitch.

Photodiodes (PD) 2011, 2012, 2013, 2014, . . . , which are light receiving elements, are two-dimensionally arranged in a lattice pattern on the light receiving surface of the area sensor 2000. The degree of integration of the light receiving elements is large enough to be able to read a document image with a resolution of 1200 dpi×1200 dpi in both the main scanning direction and the sub-scanning direction. The RGB windows of the color filter 410 correspond one-to-one with the PD 2011, 2012, 2013, 2014, . . . . The resolution of the pixel data of one pixel read by one light receiving element is 1200 dpi×1200 dpi, whereas the resolution in units of pixels of the Bayer arrangement is 600 dpi×600 dpi.

[4] Movement Unit 1000

Figure 6:
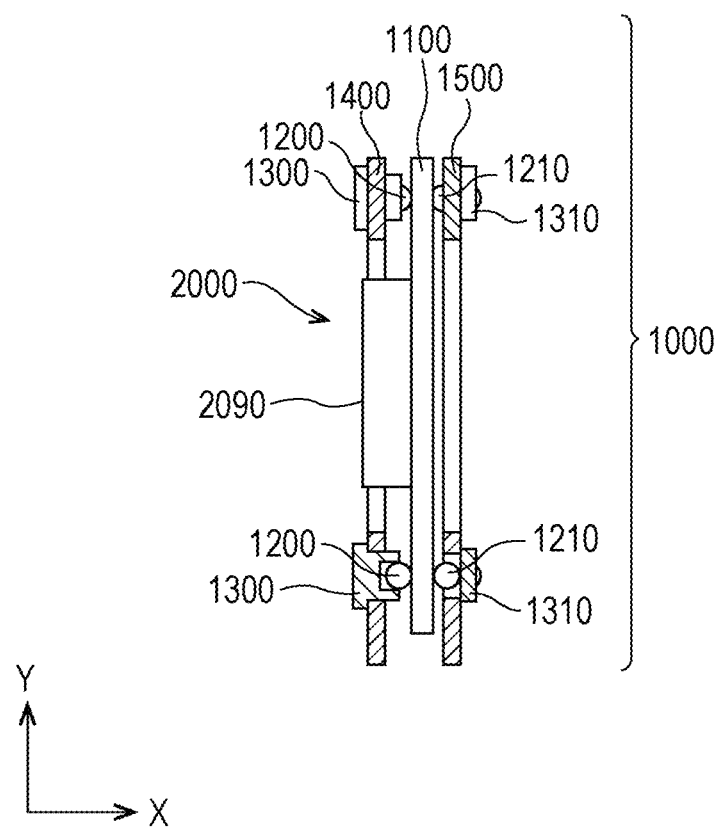
FIG. 6 is a diagram for explaining a movement mechanism of the area sensor.

FIG. 6 is a cross-sectional view of the movement unit 1000 taken along line X-Y, and illustrates only the main part. Since the movement unit 1000 is similar to the movement mechanism in the imaging device described in Japanese Patent Application Laid-Open No. 2016-131265, details are omitted here, and the movement mechanism will be briefly described. Note that the movement unit 1000 is only required to move by an odd multiple of the inter-color pitch of the Bayer arrangement, and particularly moves by the inter-color pitch in the present embodiment.

The movement unit 1000 includes a plate-like movable stage 1100 that fixedly supports the surface of the area sensor 2000 opposite to a light receiving surface 2090, and yoke plates 1400 and 1500 that slidably support the movable stage 1100 in the Y-axis direction by sandwiching the movable stage from both plate surfaces via a plurality of balls 1200 and 1210. A permanent magnet (not illustrated) is fixed to each of the yoke plates 1400 and 1500, and a winding coil (not illustrated) for driving is disposed at a position facing each permanent magnet.

In such a configuration, when the winding coil is energized, lines of magnetic force are generated from the winding coil, and the lines of magnetic force generated from the winding coil and the lines of magnetic force of the permanent magnet cause the Lorentz force in the Y-axis direction to act on the movable stage 1100, so that the area sensor 2000 integrated with the movable stage 1100 moves in the Y-axis direction with respect to the yoke plates 1400 and 1500. The yoke plates 1400 and 1500 include retainers 1300 and 1310, respectively, and when the plurality of balls 1200 and 1210 abut on the inner surfaces of the retainers 1300 and 1310, the movable stage 1100 stops in a state where the movable stage has moved in the Y-axis direction by the inter-color pitch.

The moving direction of the area sensor 2000 is controlled by the direction of an alternating current applied to the winding coil, and the moving distance of the area sensor 2000 is controlled by the amplitude of the alternating current applied to the winding coil.

In the present embodiment, the movement unit 1000 moves the area sensor 2000 between a first position in the Y-axis direction and a second position shifted from the first position in the Y-axis direction by one color (by the size of one light receiving element) of the Bayer arrangement.

Note that, in the above description, the configuration example in which the area sensor 2000 is moved using an electromagnetic force has been described, but it is not limited thereto. It is only required to have a configuration of moving the area sensor 2000 between the first position and the second position, and stopping the area sensor 2000 at a position after the movement. For example, in a ball screw mechanism, it is possible to use a configuration in which the ball screw is rotated at a minute angle by an amount corresponding to the moving distance from one of the first position and the second position of the area sensor 2000 to the other. By the movement unit 1000 moving the area sensor, the reading range of the document changes from the reading range 302 to a reading range 312 in FIG. 4.

[5] Circuit Configuration of Integrated Circuit 420 of Area Sensor 2000

Figure 7:
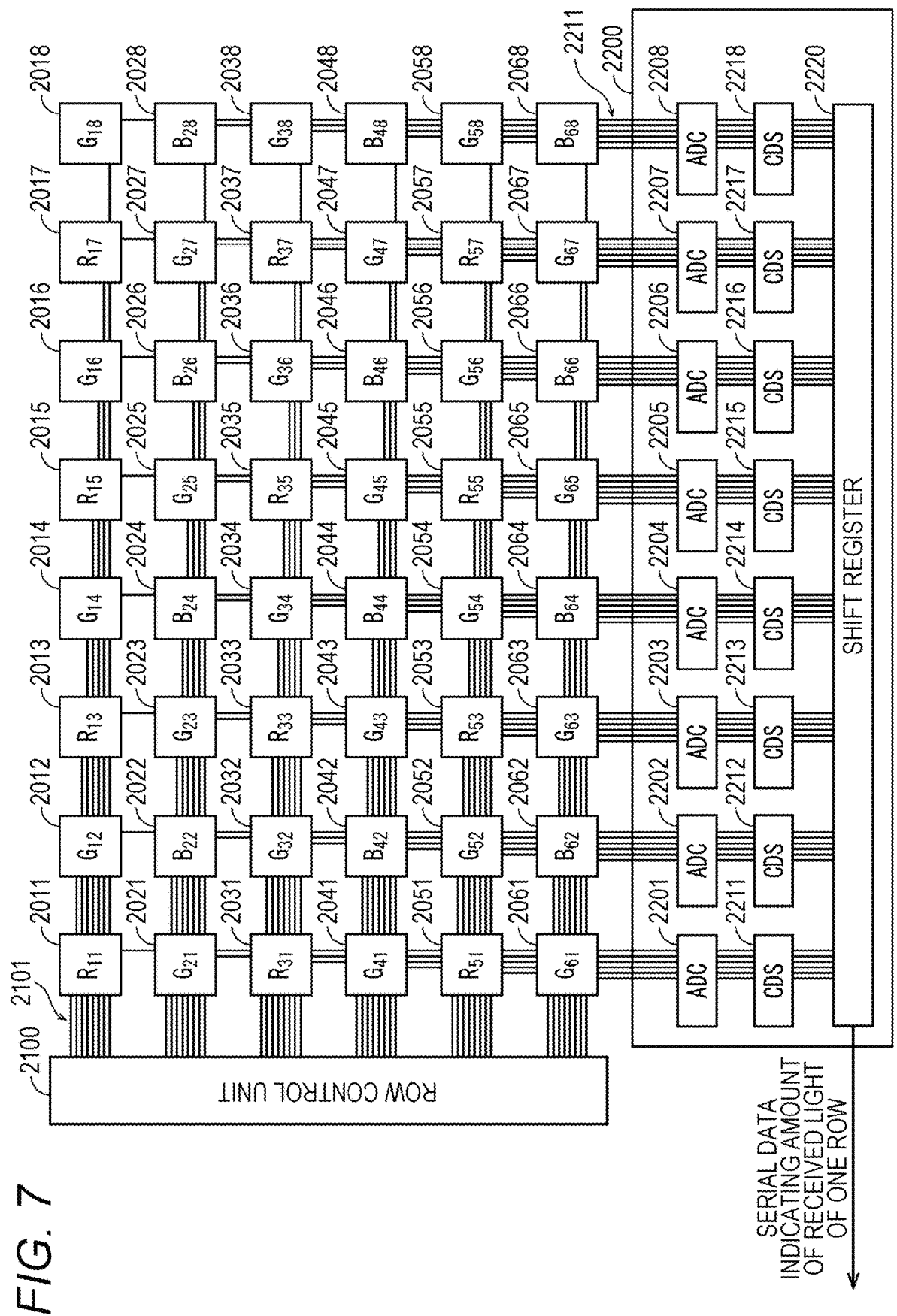
FIG. 7 illustrates a circuit configuration of the area sensor.

FIG. 7 illustrates a circuit configuration of the integrated circuit 420. In the drawing, the light receiving elements 2011, 2012, 2013, 2014, 2015, 2021, 2022, 2023, . . . are connected to a row control unit 2100 by a wire group 2101 in a row direction, and are connected to a peripheral circuit 2200 by a wire group 2211 in a column direction.

The row control unit 2100 designates a row to receive light and a row to be read among the rows of the light receiving elements 2011, 2012, 2013, 2014, 2015, 2021, 2022, 2023, . . . . The light receiving element belonging to the row designated to be read transmits a read signal indicating the amount of received light through the wire group 2211.

The peripheral circuit 2200 includes A/D Converters (ADC) 2201, 2202, 2203, and 2204 that perform AD conversion on the read signals output from the light receiving elements in the row designated to be read, correlated double sampling (CDS) 2211, 2212, 2213, and 2214 that perform correlated double sampling, and a shift register 2220 that performs parallel/serial conversion on the amounts of received light indicated by the plurality of read signals and outputs the converted signals.

The quantization bit width of the ADC 2201 and 2202 is 8 bits, and the amount of received light detected by each light receiving element is converted into an 8-bit value. As a result, the amount of received light detected by each light receiving element is converted into pixel data that is a bit string representing 256 gradations from 0 to 255.

The amount of received G light digitized by the AD conversion of the peripheral circuit 2200 is referred to as "G value". Similarly, the amounts of received R light and B light digitized by the AD conversion of the peripheral circuit 2200 are referred to as "R value" and "B value", respectively.

Serial data obtained by the parallel/serial conversion of the peripheral circuit 2200 is referred to as "read data". Serial data of a plurality of rows including the amounts of received light detected by the light receiving elements of all the rows is referred to as "band data". Reading using the area sensor 2000 and the movement of the area sensor 2000 are repeated to read one document. By setting the amounts of received light detected by the light receiving elements in 2 rows×2 columns to the R value, the G value, and the B value of one pixel in the Bayer arrangement, image data with a resolution of 600 dpi×600 dpi is generated. In addition, as will be described later, after the first reading, an operation of shifting the position of the area sensor 2000 by one light receiving element in the sub-scanning direction is performed to perform the second reading, so that image data with a resolution of 1200 dpi×1200 dpi can be generated from the second read data from the light receiving elements and the first read data from the light receiving elements.

[6] Control System of Image Reader 100

Figure 8:
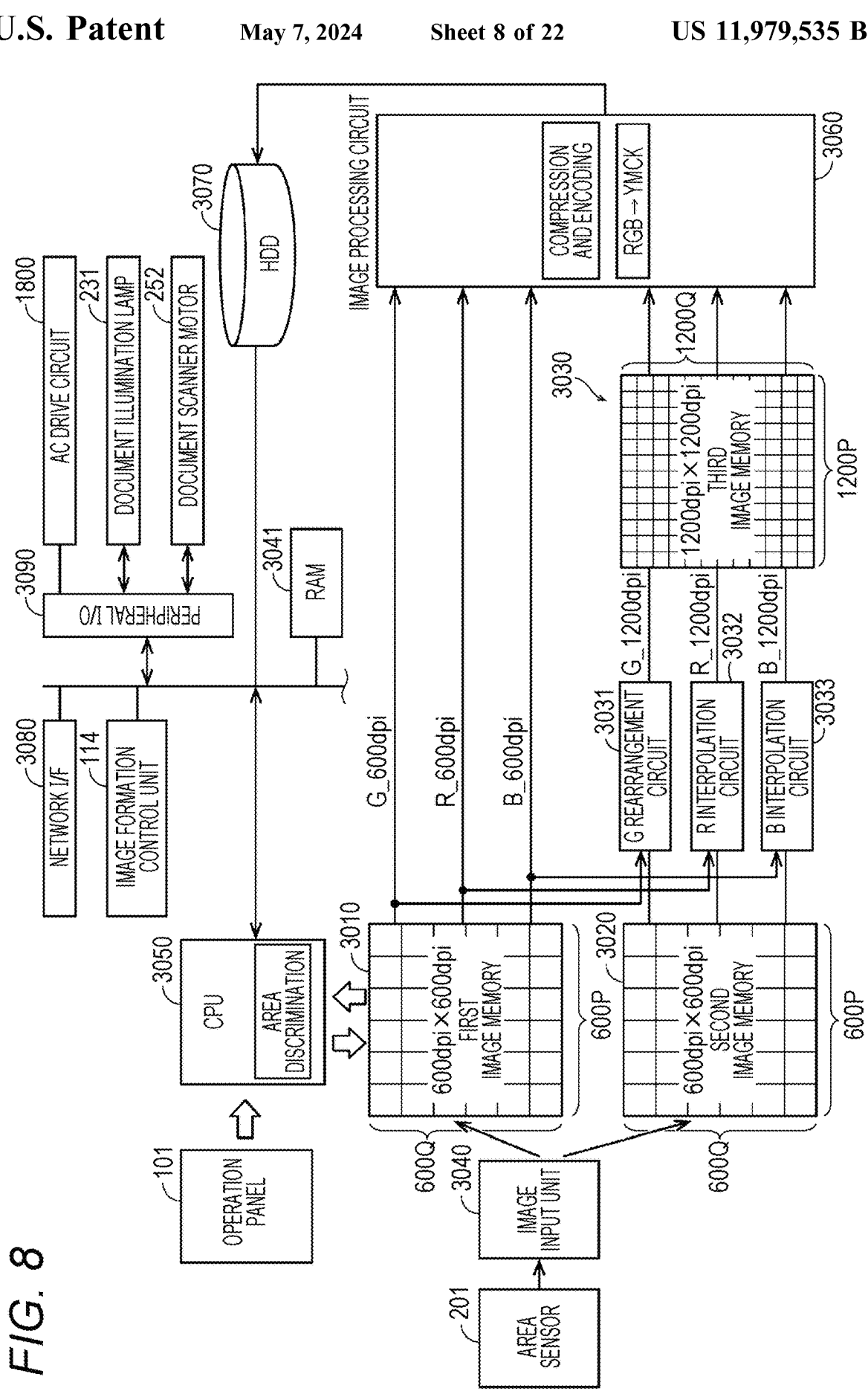
FIG. 8 illustrates a control system of the image reader.

FIG. 8 illustrates a control system of the image reader 100. In the control system of the drawing, while the area sensor 2000 is single, three (a first image memory 3010, a second image memory 3020, and a third image memory 3030) image data storage memories are provided in the multi-function peripheral 1, so that 600 dpi×600 dpi image data and 1200 dpi×1200 dpi image data are generated.

Among these three image data storage memories, the first image memory 3010 is a memory for storing read data obtained by the first reading using the area sensor 2000, and the second image memory 3020 is a memory for storing read data obtained by the second reading using the area sensor 2000.

The first image memory 3010 includes storage elements in 600P rows×600Q columns. The word length of the storage element of the first image memory 3010 is 4 bytes (=32 bits), and the amounts of received light from the light receiving elements in 2 rows×2 columns are stored and set as a value (the R value, G value, G value, B value) of one pixel of 600 dpi×600 dpi observed image data. P is a value representing the vertical width of an A3 sheet in inches, and Q is a value representing the horizontal width of the A3 sheet in inches. Since there are storage elements with a word length of 4 bytes in 600P rows×600Q columns, pixels of one A3 document read with a reading resolution of 600 dpi×600 dpi can be stored. The 600 dpi×600 dpi image data stored in the first image memory 3010 is image data generated by reading without shifting the area sensor 2000, and is hereinafter referred to as "observed image data".

Similarly to the first image memory 3010, the second image memory 3020 includes storage elements in 600P rows×600Q columns. Regarding the word length of each storage element, similarly to the first image memory 3010, the storage element of the second image memory 3020 is 4 bytes (=32 bits), and the amounts of received light from the light receiving elements in 2 rows×2 columns are stored and set as a value (the G value, R value, G value, B value) of one pixel of 600 dpi×600 dpi image data. The 600 dpi×600 dpi image data stored in the second image memory 3020 is image data generated by the second reading, and includes pixels obtained by shifting the area sensor 2000 in the Y-axis direction of FIG. 3 and performing reading so as to have a phase shift in the sub-scanning direction with respect to the pixels of the observed image data, and is hereinafter referred to as "pixel shift image data".

The third image memory 3030 includes storage elements in 1200P rows×1200Q columns. The word length of each storage element is 3 bytes (=24 bits), and is set as a value (the G value, R value, B value) of one pixel of 1200 dpi×1200 dpi image data. Since there are storage elements with a word length of 3 bytes in 1200P rows×1200Q columns, the third image memory 3030 can store pixels of one A3 document with a resolution of 1200 dpi×1200 dpi. 1200 dpi×1200 dpi image data obtained using the observed image data and the pixel shift image data is hereinafter referred to as "mosaic image data".

An image input unit 3040 captures serial data output from the shift register 2220 of the area sensor 2000 and divides the serial data based on the word length of the storage elements in the first image memory 3010 and the second image memory 3020. For the serial data obtained by the first reading, the amount of received light obtained by the division based on the word length of the storage element is written in the storage element of the first image memory 3010, and for the serial data obtained by the second reading, the amount of received light obtained by the division based on the word length of the storage element is written in the storage element of the second image memory 3020.

The first image memory 3010 and the second image memory 3020 include a memory controller and a memory bus. In reading data, the memory controller receives, from a CPU 3050, a designation of a row number and a column number from which the R value is to be read, a designation of a row number and a column number from which the G value is to be read, and a designation of a row number and a column number from which the B value is to be read. The R value, the G value, and the B value (G_600 dpi, R_600 dpi, and B_600 dpi in the drawing) are output from the storage elements corresponding to the designated row numbers and column numbers to an image processing circuit 3060, a G rearrangement circuit 3031, an R interpolation circuit 3032, and a B interpolation circuit 3033.

The third image memory 3030 also includes a similar memory controller and a similar memory bus, and performs writing of data in the storage element and reading of data from the data.

In reading data, a designation of a row number and a column number from which the R value is to be read, a designation of a row number and a column number from which the G value is to be read, and a designation of a row number and a column number from which the B value is to be read are received from the CPU 3050, and the R value, the G value, and the B value (G_1200 dpi, R_1200 dpi, and B_1200 dpi in the drawing) are output to the image processing circuit 3060 from the storage elements corresponding to the designated row numbers and column numbers.

[7] Operating Principle

The G rearrangement circuit 3031, the R interpolation circuit 3032, and the B interpolation circuit 3033 in FIG. 8 are dedicated circuits provided to generate mosaic image data of 1200 dpi×1200 dpi from the observed image data stored in the first image memory 3010 and the pixel shift image data stored in the second image memory 3020.

Specifically, the G rearrangement circuit 3031 is a circuit element that writes the R value, the G value, and the B value stored in the storage elements of the first image memory 3010 and the R value, the G value, and the B value stored in the storage elements of the second image memory 3020 in the storage element of the third image memory 3030 as values of one pixel, the R interpolation circuit 3032 is a circuit element that calculates the average value of the R values stored in the storage elements of the first image memory 3010, and the B interpolation circuit 3033 is a circuit element that calculates the average value of the B values stored in the storage elements of the first image memory 3010.

A process in which the first image memory 3010, the second image memory 3020, and the third image memory 3030 generate mosaic image data of 1200 dpi×1200 dpi will be described with reference to FIGS. 9A to 9E.

FIGS. 9A and 9B illustrate first reading by the light receiving element.

FIG. 9A illustrates a matrix area obtained by dividing a document to be read with a resolution of 1200 dpi×1200 dpi. The numerical values in parentheses in the drawing indicate the row numbers and the column numbers of individual portions (that are minute portions where light from a light source is reflected) in the matrix area.

FIG. 9B illustrates light receiving elements in 5 rows×8 columns arranged in a matrix. In the drawing, R, G, and B represent light receiving elements that receive transmitted light transmitted through the R, G, and B windows of the color filter 410. The suffixes after R, G, and B indicate which row and which column the corresponding light receiving element is located.

In the state of FIG. 9A, at the time of the first reading, the reflected light from a minute portion (1, 1) is incident on a light receiving element of $R_{11}$ in FIG. 9B, the reflected light from a minute portion (1, 2) is incident on a light receiving element of $G_{12}$ in FIG. 9B, the reflected light from a minute portion (2, 1) is incident on a light receiving element of $G_{21}$ in FIG. 9B, and the reflected light from a minute portion (2, 2) is incident on a light receiving element of $B_{22}$. The peripheral circuit 2200 of the area sensor 2000 converts the amounts of received light detected by these light receiving elements into digital values, so that the R value of the minute portion (1, 1), the G value of the minute portion (1, 2), the G value of the minute portion (2, 1), and the B value of the minute portion (2, 2) are obtained.

Similarly, the reflected light from a minute portion (3, 1) is incident on a light receiving element of $R_{31}$ in FIG. 9B, the reflected light from a minute portion (3, 2) is incident on a light receiving element of $G_{32}$ in FIG. 9B, the reflected light from a minute portion (4, 1) is incident on a light receiving element of $G_{41}$ in FIG. 9B, and the reflected light from a minute portion (4, 2) is incident on a light receiving element of $B_{42}$ in FIG. 9B. The peripheral circuit 2200 of the area sensor 2000 converts the amounts of received light detected by these light receiving elements into digital values, so that the R value of the minute portion (3, 1), the G value of the minute portion (3, 2), the G value of the minute portion (4, 1), and the B value of the minute portion (4, 2) are obtained.

When the amounts of received light detected by the light receiving elements in 2 rows×2 columns including $R_{11}$, $G_{12}$, $G_{21}$, and $B_{22}$ and the amounts of received light detected by the light receiving elements in 2 rows×2 columns including $R_{31}$, $G_{32}$, $G_{41}$, and $B_{42}$ are written in the storage elements of the first image memory 3010 as the R value, the G value, and the B value of one pixel, observed image data of 600 dpi×600 dpi is obtained in the first image memory 3010. Note that since there are two G values per pixel, one of the two G values or the average value thereof is written.

FIGS. 9C and 9D illustrate second reading by the light receiving element.

FIG. 9C illustrates the matrix area of the document in a case where the relative position of the document D in the sub-scanning direction is shifted by one pixel of 1200 dpi by causing the movement unit 1000 to move after the first reading and before the second reading and shifting the area sensor 2000 in the sub-scanning direction. When the second reading is performed on the same document in a state where the area sensor 2000 is shifted in the sub-scanning direction, as illustrated in FIG. 9D, the relationship between the light receiving elements and the document D is shifted one row, the reflected light from the minute portion (2, 1) is incident on the light receiving element of Ru, the reflected light from the minute portion (2, 2) is incident on the light receiving element of $G_{12}$, the reflected light from the minute portion (3, 1) is incident on the light receiving element of $G_{21}$, and the reflected light from the minute portion (3, 2) is incident on the light receiving element of $B_{22}$. By converting the amounts of received light detected by $R_{11}$, $G_{12}$, $G_{21}$, and $B_{22}$ from analog values to digital values, the R value of the minute portion (2, 1), the G value of the minute portion (2, 2), the G value of the minute portion (3, 1), and the B value of the minute portion (3, 2) are obtained. By writing these values in the second image memory 3020, image data (pixel shift image data) of 600 dpi×600 dpi in which the relationship between the document area and the light receiving elements is shifted one row is obtained.

FIG. 9E shows a process of writing in the third image memory 3030.

In FIG. 9E, r21, g21, and b21 indicate an R value, a G value, and a B value to be written in the storage element located in the second row and first column in the third image memory 3030 with respect to the minute portion (2, 1) of the document. Since $R_{11}$ is detected at the time of the second reading and $G_{21}$ is detected at the time of the first reading, the amount of received light of $R_{11}$ stored in the storage element in the first row and first column in the second image memory 3020 and the amount of received light of $G_{21}$ stored in the storage element in the second row and first column in the second image memory 3020 are written in the storage element located in the second row and first column in the third image memory 3030. As a result, r21 and g21 are obtained.

The amount of received B light is not detected in the minute portion (2, 1). Therefore, the B interpolation circuit 3033 calculates the average value of the amounts of received light of $B_{22}$ and $B_{24}$ located in the same row, and sets the calculated average value as an interpolated value. Since the detection values of $B_{22}$ and $B_{24}$ are stored in the first image memory 3010, $(B_{22}+B_{24})/2$ is calculated as the average value of the detection values of $B_{22}$ and $B_{24}$ from the first image memory 3010, and is written in the storage element in the second row and first column in the third image memory 3030. As a result, b21 to be written in the second row and first column in mosaic image data of 1200 dpi×1200 dpi is obtained.

In FIG. 9E, r22, g22, and b22 indicate an R value, a G value, and a B value to be written in the storage element located in the second row and second column in the third image memory 3030 with respect to the minute portion (2, 2) of the document. Since $B_{22}$ is detected at the time of the first reading and $G_{12}$ is detected at the time of the second reading, the G rearrangement circuit 3031 writes the amount of received light of $B_{22}$ stored in the storage element in the second row and second column in the first image memory 3010 and the amount of received light of $G_{12}$ stored in the storage element in the first row and second column in the second image memory 3020 in the storage element located in the second row and second column in the third image memory 3030. As a result, g22 and b22 are obtained.

The amount of received R light is not detected in the minute portion (2, 2). Therefore, the R interpolation circuit 3032 calculates the average value of the amounts of received light of $R_{11}$ and $R_{13}$ located in the adjacent row, and sets the calculated average value as an interpolated value. Since the detection values of $R_{11}$ and $R_{13}$ are stored in the first image memory 3010, $(R_{11}+R_{13})/2$ is calculated as the average value of the detection values of $R_{11}$ and $R_{13}$ from the first image memory 3010, and is written in the storage element in the second row and second column in the third image memory 3030. As a result, the R value to be written in the second row and second column in the mosaic image data of 1200 dpi×1200 dpi is obtained. Similarly, RGB values are written in the storage element in the third row and first column in the third image memory 3030 and the storage element in the third row and second column in the third image memory 3030. In this way, the mosaic image data of 1200 dpi×1200 dpi is obtained.

[8] Other Components of Control System

In addition, the control system of the image reader 100 includes the CPU 3050, a RAM 3041, and a peripheral I/O 3090.

The CPU 3050 executes overall control of the image reader 100 based on a setting operation performed on the operation receiving unit 101 by the user. In a case where the user selects scan, the setting operation performed by the user includes a transmission destination, a document image quality, a resolution, and a file format.

The image processing circuit 3060 encodes the observed image data of 600 dpi×600 dpi stored in the first image memory 3010 and the mosaic image data of 1200 dpi×1200 dpi stored in the third image memory 3030. If the job selected by the user is scan, the image data stored in the first image memory 3010 or the third image memory 3030 is converted into the file format set by the setting operation of the user. Examples of the file format include JPEG, TIFF, PDF, and compact PDF. The file of the image data obtained by such conversion is stored in an HDD 3070 and transmitted to the destination set by the setting operation of the user by a network IF 3080. If the job selected by the user is copy, the image data stored in the first image memory 3010 or the third image memory 3030 is converted from an RGB format to a YMCK format. The YMCK image data thus obtained is passed to a control unit (an image formation control unit 114) of the image forming unit 111. The image formation control unit 114 performs image formation on the basis of the YMCK image data.

An AC drive circuit 1800 illustrated in FIG. 8 energizes the winding coil of the movement unit 1000 to move the area sensor 2000. The AC drive circuit 1800 controls the moving direction of the area sensor 2000 based on the direction of an alternating current applied to the winding coil, and controls the moving operation of the area sensor 2000 based on the amplitude of the alternating current applied to the winding coil.

The AC drive circuit 1800, the document illumination lamp 231 illustrated in FIG. 3, and the document scanner motor 252 are connected to the control system in FIG. 8 via the peripheral I/O 3090. The CPU 3050 can control the on and off of the document illumination lamp 231, the drive of the document scanner motor 252, the shift of the area sensor 2000, light reception by the area sensor 2000, reading of the amount of received light, and AC signal transmission by the AC drive circuit 1800 via the peripheral I/O 3090.

A built-in program for performing copy and scan is installed in the HDD 3070.

[9] Control Procedure

When the power of the multi-function peripheral 1 is turned on, the CPU 3050 loads the built-in program into the RAM 3041 and executes the built-in program. The built-in program loaded into the RAM 3041 by the CPU 3050 includes a program defining a scan procedure.

Figure 10:
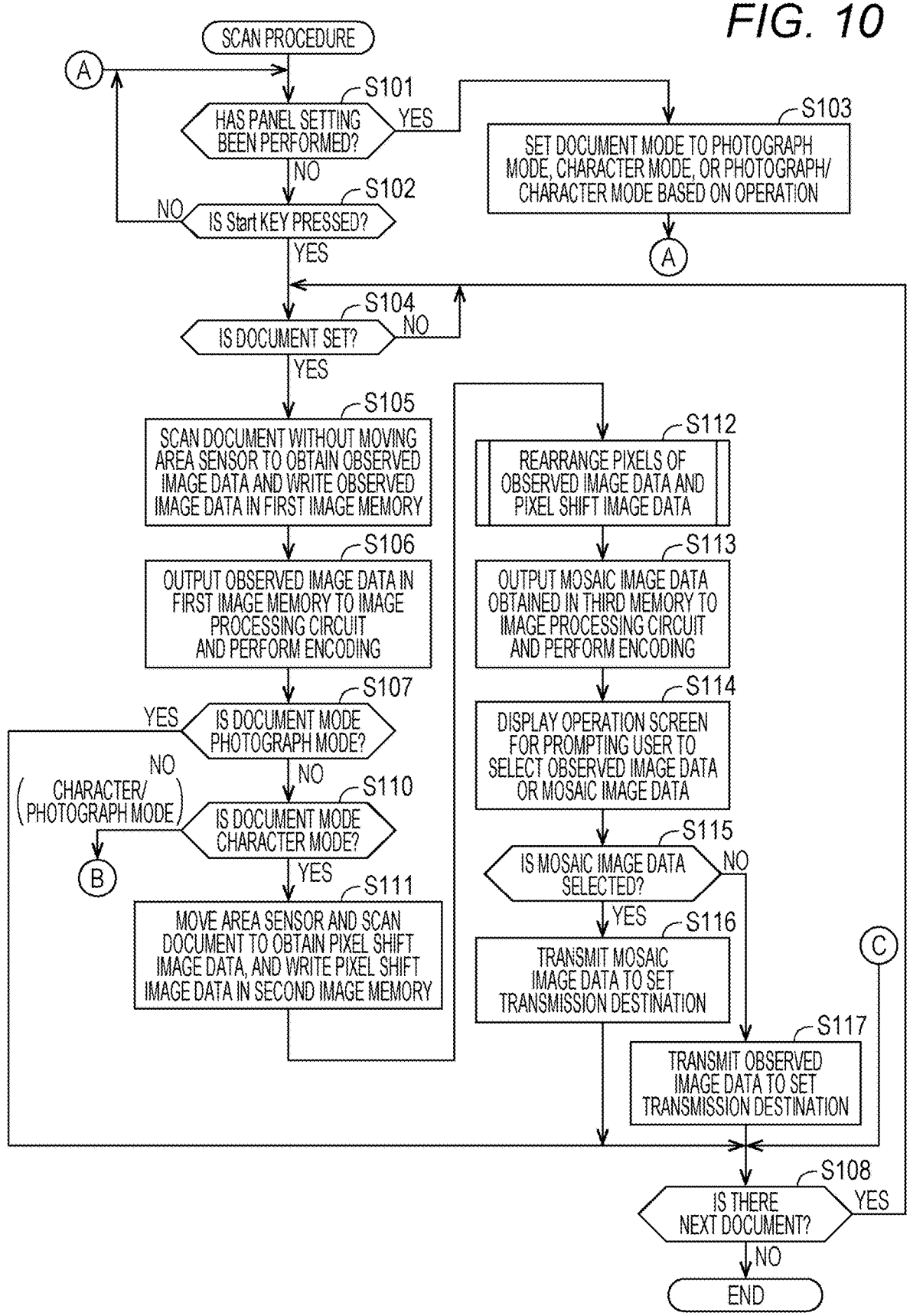
FIG. 10 is a flowchart illustrating a scan procedure.
Figure 14A:
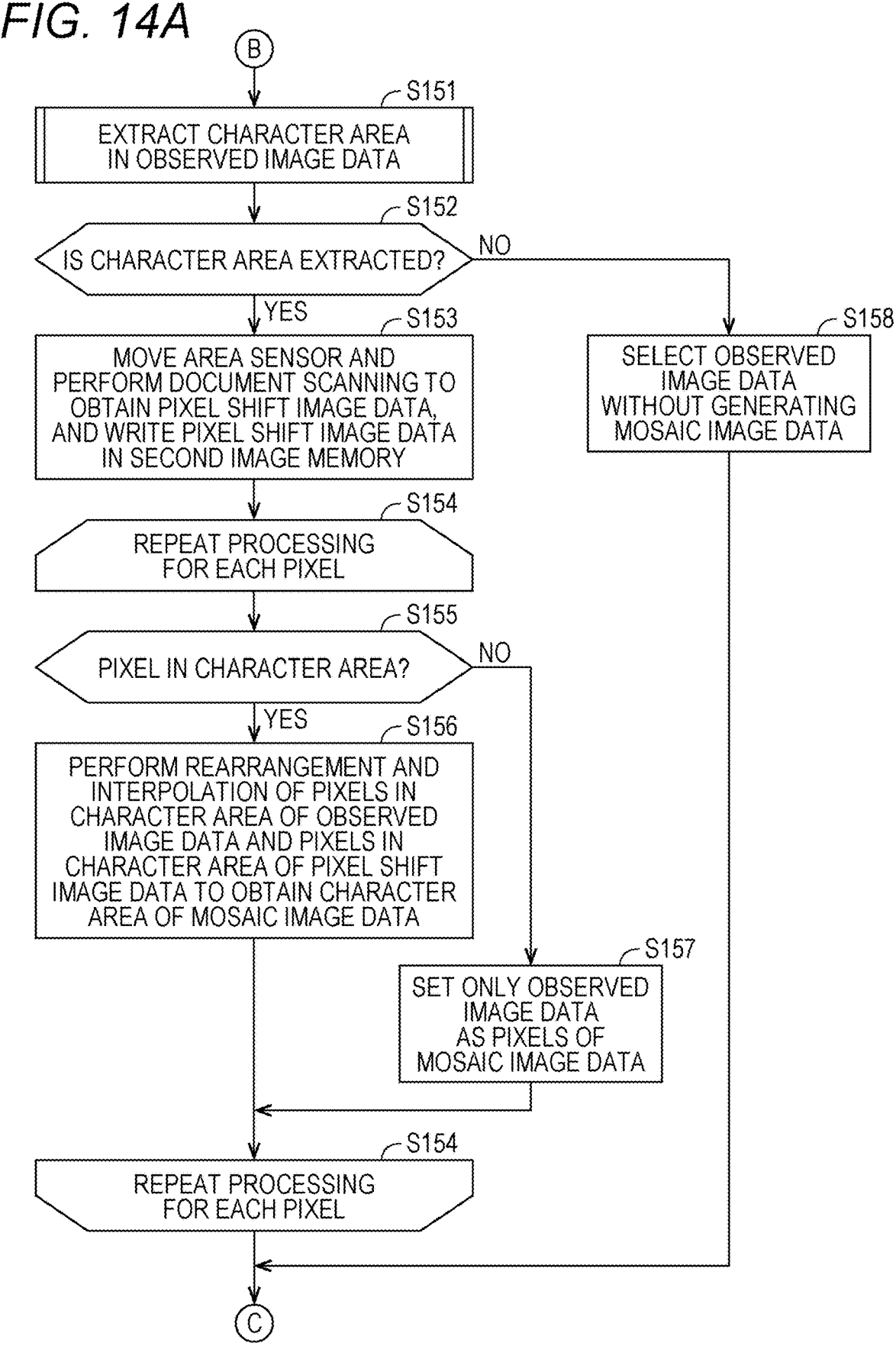
FIG. 14A is a flowchart illustrating a processing procedure in a case where a character/photograph mode is selected.

FIGS. 10 and 14A are flowcharts illustrating a scan procedure. The flowcharts of FIGS. 10 and 14A are characterized in that the first image data and the second image data are selected in three stages. The three stages include a preliminary first selection before the first image data and the second image data are generated, a second selection in a middle stage after the first image data is generated and before the second image data is generated, and a third selection after the first and second image data are generated. Step S107 in FIG. 10 shows the preliminary first selection before the first image data and the second image data are generated. Step S155 in FIG. 14A shows the second selection in the middle stage after the first image data is generated and before the second image data is generated. Step S115 in FIG. 10 shows the further third selection after the first image data and the second image data are generated.

When this flowchart is activated, the processing proceeds to a loop of steps S101 and S102. This loop repeats a determination as to whether panel setting has been performed (step S101) and a determination as to whether the Start key 5002 is pressed (step S102).

If any button on the touch panel of the operation receiving unit 101 is pressed (Yes in step S101), various settings are performed based on the operation of the user (step S103). When the operation is performed, the setting based on the operation is written in the RAM 3041.

If the Start key is pressed (Yes in step S102), it is determined whether a document is set on the platen glass (step S104). If the document is set (Yes in step S104), the first document reading (the first reading) is performed without moving the area sensor, and observed image data of 600 dpi×600 dpi is obtained and written in the first image memory 3010 (step S105).

The 600 dpi×600 dpi observed image data in the first image memory 3010 is output to the image processing circuit 3060 to perform encoding (step S106). Thereafter, it is determined whether the document mode is a photograph mode (step S107). If the document mode is the photograph mode (Yes in step S107), it is determined whether there is the next document (step S108), and if there is the next document (Yes in step S108), the processing returns to step S104.

If the document image quality mode is not the photograph mode (No in step S107) but a character mode (Yes in step S110), the movement unit 1000 moves the area sensor 2000 as the character mode, the second document reading (the second reading) is performed, and pixel shift image data of 600 dpi×600 dpi is obtained and written in the second image memory 3020 (step S111). Then, in step S112, the pixels of the observed image data and the pixels of the pixel shift image data are rearranged.

Figure 11:
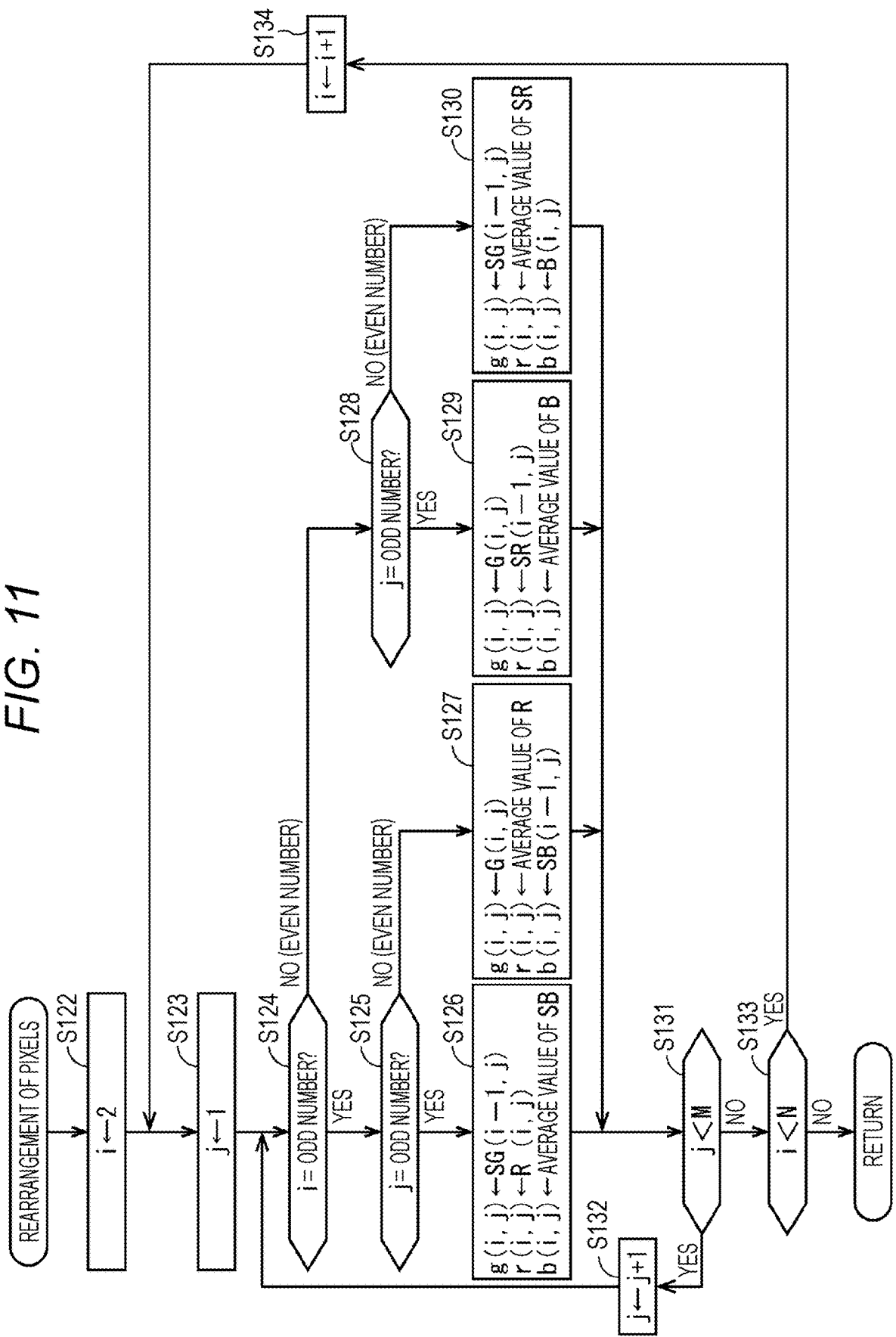
FIG. 11 is a flowchart illustrating the details of step S112 in FIG. 10.

The flowchart of FIG. 11 illustrates the details of step S112 in FIG. 10.

A variable i is a variable representing a row to be processed in the matrix area illustrated in FIG. 9A, and a variable j is a variable representing a column to be processed in the matrix area illustrated in FIG. 9A. M represents the total number of pixels in the sub-scanning direction at 1200 dpi×1200 dpi, and N represents the total number of pixels in the main scanning direction at 1200 dpi×1200 dpi.

$G(i, j)$ represents a G value stored in the first image memory 3010 and detected by the light receiving element located in the i-th row and j-th column in the area sensor 2000, $R(i, j)$ represents an R value stored in the first image memory 3010 and detected by the light receiving element located in the i-th row and j-th column, and $B(i, j)$ represents a B value stored in the first image memory 3010 and detected by the light receiving element located in the i-th row and j-th column. $SG(i, j)$ represents a G value stored in the second image memory 3020 and detected by the light receiving element located in the i-th row and j-th column, $SR(i, j)$ represents an R value stored in the second image memory 3020 and detected by the light receiving element located in the i-th row and j-th column, and $SB(i, j)$ represents a B value stored in the second image memory 3020 and detected by the light receiving element located in the i-th row and j-th column.

$g(i, j)$ represents a G value located in the ith row and jth column, $r(i, j)$ represents an R value located in the ith row and jth column, and $b(i, j)$ represents a B value located in the ith row and jth column in the mosaic image data in mosaic image data of 1200 dpi×1200 dpi.

In the procedure of FIG. 11, since the RGB values of the pixels one row above are used to determine the pixels of the observed image data, the mosaic image data of the first row is not targeted. For the pixels located in the first row of mosaic image data, appropriate RGB values are determined and then processing starts. That is, after the variable i is set to 2 (step S122), the loop of steps S123 to S134 is performed.

The loop of steps S123 to S134 is a double loop.

The inner loop is a loop for the variable j, and repeats the processing of setting the variable j to 1 (step S123), then performing the processing of steps S124 to S130 to determine whether the variable j is less than M (step S131), and if the variable j is less than M (Yes in step S131), incrementing the variable j (step S132), and returning to step S124.

Step S124 is a determination as to whether the variable i is an odd number, and step S125 is a determination as to whether the variable j is an odd number. By a combination of these determinations, the R value, the G value, and the B value of the pixels of the mosaic image data are determined in any of steps S126, S127, S129, and S130.

If i is an odd number and j is an odd number, and thus the pixel is in an odd-numbered row and an odd-numbered column, Yes is selected in step S124 and Yes is selected in step S125, so that $g(i, j)$ is $SG(i-1, j)$, $r(i, j)$ is $R(i, j)$, and $b(i, j)$ is the average value of SB obtained by the B interpolation circuit 3033 (step S126).

If i is an odd number and j is an even number, and thus the pixel is in an odd-numbered row and an even-numbered column, Yes is selected in step S124 and No is selected in step S125, so that $g(i, j)$ is $G(i, j)$, $r(i, j)$ is the average value of R obtained by the R interpolation circuit 3032, and $b(i, j)$ is $SB(i-1, j)$ (step S127).

If i is an even number and j is an odd number, and thus the pixel is in an even-numbered row and an odd-numbered column, No is selected in step S124 and Yes is selected in step S128, so that $g(i, j)$ is $G(i, j)$, $r(i, j)$ is $SR(i-1, j)$, and $b(i, j)$ is the average value of B obtained by the B interpolation circuit 3033 (step S129).

If i is an even number and j is an even number, and thus the pixel is in an even-numbered row and an even-numbered column, No is selected in step S124 and No is selected in step S128, so that $g(i, j)$ is $SG(i-1, j)$, $r(i, j)$ is the average value of SR obtained by the R interpolation circuit 3032, and $b(i, j)$ is $B(i, j)$.

The outer loop is a loop for the variable i. If the variable j exceeds M (No in step S131), it is determined whether the variable i is less than N (step S133). If the variable i is less than N (Yes in step S133), the variable i is incremented (step S134), and the processing returns to step S123.

[10] Timing Chart

Figure 12:
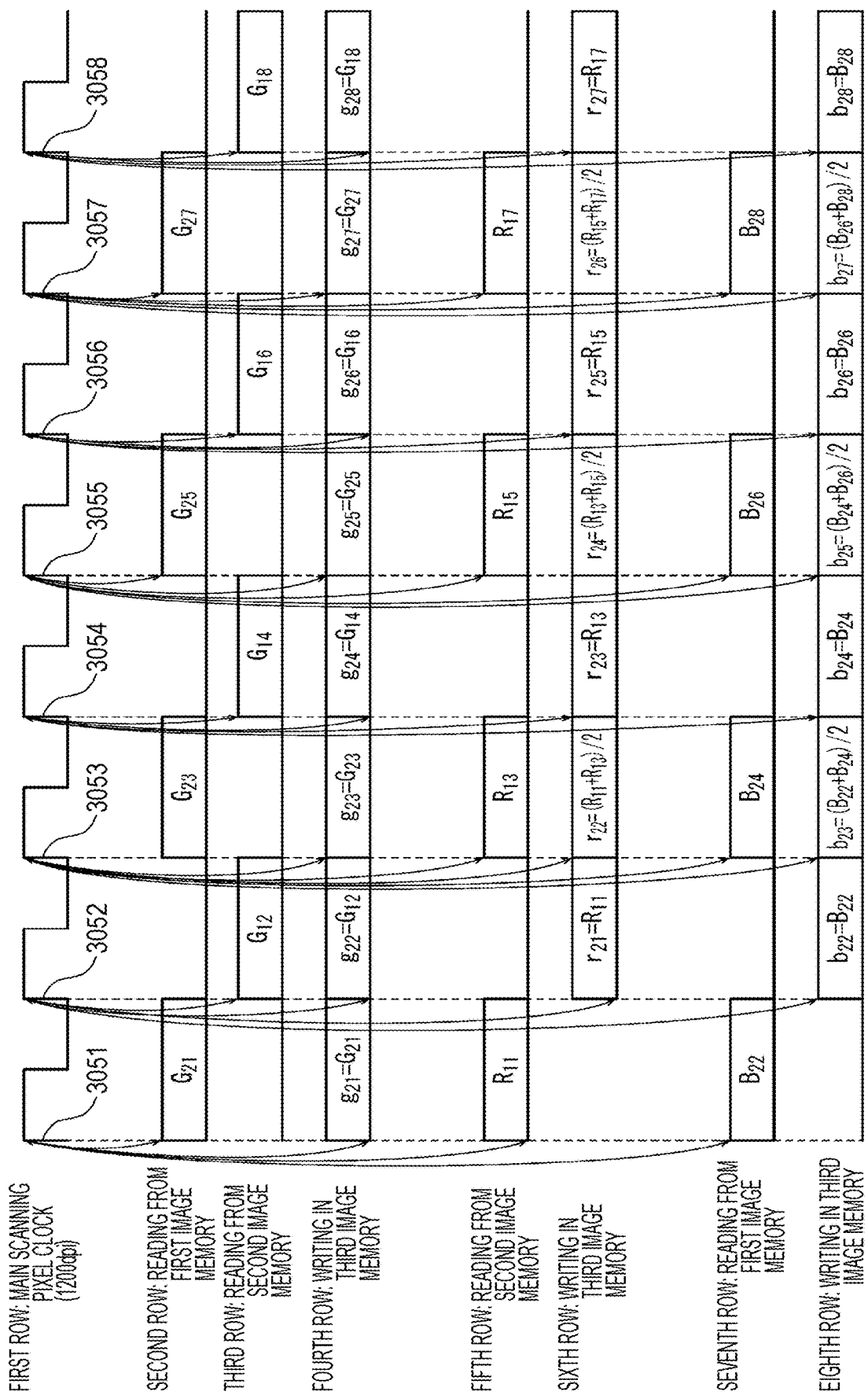
FIG. 12 is a timing chart illustrating writing of data in a first image memory and a second image memory, reading of data from the first image memory and the second image memory, and writing of data in the third image memory.

FIG. 12 is a timing chart illustrating reading of data from the first image memory 3010 and the second image memory 3020, and writing of data in the third image memory 3030.

The first row in FIG. 12 illustrates a main scanning direction pixel clock that is an operation clock of the third image memory 3030.

The memory controller of the first image memory 3010 outputs $G_{21}$, $G_{23}$, $G_{25}$, and $G_{27}$ to the memory bus at odd-numbered rising timings 3051, 3053, 3055, and 3057 of the main scanning direction clock, respectively, and the second image memory 3020 outputs $G_{12}$, $G_{14}$, $G_{16}$, and $G_{18}$ to the memory bus at even-numbered rising timings 3052, 3054, 3056, and 3058 of the main scanning direction clock, respectively, as illustrated in the third row.

As illustrated in the fourth row, the memory controller of the third image memory 3030 writes the G value output to the memory bus at each rising edge of the main scanning direction clock in the corresponding storage element of the third image memory 3030.

Specifically, at the rising timing 3051 of the main scanning clock, $G_{21}$ output to the memory bus of the first image memory 3010 is written in the storage element in the second row and first column in the third image memory 3030 as g21.

At the rising timing 3052 of the main scanning clock, $G_{12}$ output to the memory bus of the second image memory 3020 is written in the storage element in the second row and second column in the third image memory 3030 as g22. At the rising timing 3053 of the main scanning clock, $G_{23}$ output to the memory bus of the second image memory 3020 is written in the storage element in the second row and third column in the third image memory 3030 as g23.

The fifth and sixth rows show reading/writing of the R value.

The first image memory 3010 outputs $R_{11}$, $R_{13}$, $R_{15}$, and $R_{17}$ to the memory bus at odd-numbered rising timings 3051, 3053, 3055, and 3057 of the main scanning direction clock, respectively.

When $R_{11}$ is output from the second image memory 3020, the R interpolation circuit 3032 stores $R_{11}$ therein. Then, when $R_{13}$ is output at the rising timing 3053 of the main scanning direction clock, the average value $(R_{11}+R_{13})/2$ of $R_{11}$ stored before and $R_{13}$ is calculated. Thereafter, similarly, the average value of $R_{13}$ and $R_{15}$ $(R_{13}+R_{15})/2$ is calculated at the rising timing 3055 of the main scanning direction clock, and the average value of $R_{15}$ and $R_{17}$ $(R_{15}+R_{17})/2$ is calculated at the rising timing 3057 of the main scanning direction clock.

At the rising edge 3052 of the main scanning direction clock, the memory controller of the third image memory 3030 writes $R_{11}$ in the storage element in the second row and first column as r21. At the rising edge 3053 of the main scanning direction clock, the average value $(R_{11}+R_{13})/2$ calculated by the R interpolation circuit 3032 is written in the storage element in the second row and second column as r22. Thereafter, similarly, at the rising edge 3054 of the main scanning direction clock, $R_{13}$ is stored in a storage element r23 in the second row and third column, and at the rising edge 3055 of the main scanning direction clock, the average value $(R_{13}+R_{15})/2$ calculated by the R interpolation circuit 3032 is written in a storage element r24 in the second row and second column.

The seventh and eighth rows show reading/writing of the B value.

The memory controller of the first image memory 3010 outputs $B_{22}$, $B_{24}$, $B_{26}$, and $B_{28}$ to the memory bus at odd-numbered rising edges 3051, 3053, 3055, and 3057 of the main scanning direction clock, respectively.

When $B_{22}$ is output from the first image memory 3010, the B interpolation circuit 3033 stores $B_{22}$ therein. Then, when $B_{24}$ is output at the rising timing 3053 of the main scanning direction clock, the average value $(B_{22}+B_{24})/2$ of $B_{22}$ stored before and $B_{24}$ is calculated. Thereafter, similarly, the average value of $B_{24}$ and $B_{26}$ $(B_{24}+B_{26})/2$ is calculated at the rising timing 3055 of the main scanning direction clock, and the average value of $B_{26}$ and $B_{28}$ $(B_{26}+B_{28})/2$ is calculated at the rising timing 3057 of the main scanning direction clock.

At the rising edge 3052 of the main scanning direction clock, the memory controller of the third image memory 3030 writes $B_{22}$ in the storage element in the second row and second column as b22. At the rising edge 3053 of the main scanning direction clock, the average value $(B_{22}+B_{24})/2$ calculated by the B interpolation circuit 3033 is written in the storage element in the second row and third column as b23. Thereafter, similarly, at the rising edge 3054 of the main scanning direction clock, $B_{24}$ is written in the storage element in the second row and fourth column as b24. At the rising edge 3055 of the main scanning direction clock, the average value $(B_{24}+B_{26})/2$ calculated by the B interpolation circuit 3033 is written in the storage element in the second row and fifth column as b25.

FIG. 13 shows comparison between a character of 600 dpi×600 dpi observed image data obtained in the first image memory 3010 and the second image memory 3020 and a character of 1200 dpi×1200 dpi mosaic image data obtained in the third image memory 3030. Since the number of vertical and horizontal pixels is doubled in the character of the 1200 dpi×1200 dpi mosaic image data, it can be seen that the beauty of the form is delicately expressed.

When the 1200 dpi×1200 dpi mosaic image data is obtained in the third image memory 3030 by the above processing, the 1200 dpi×1200 dpi mosaic image data in the third image memory 3030 is output to the image processing circuit 3060 and encoded (step S113). Thereafter, the operation screen illustrated in FIG. 2 is displayed (step S114), and it is determined whether the 1200 dpi×1200 dpi mosaic image data is selected (step S115).

If the 1200 dpi×1200 dpi mosaic image data is selected (Yes in step S115), the 1200 dpi×1200 dpi mosaic image data is transmitted to the set transmission destination (step S116). If the 600 dpi×600 dpi observed image data is selected (No in step S115), the 600 dpi×600 dpi observed image data is transmitted to the set transmission destination (step S117).

[11] Case where Document Image Quality is Character/Photograph

When the document image quality mode is the character/photograph mode, No is selected in step S110, and the processing proceeds to step S151 in FIG. 14A.

A character area in the 600 dpi×600 dpi observed image data is extracted (step S151).

Figure 14B:
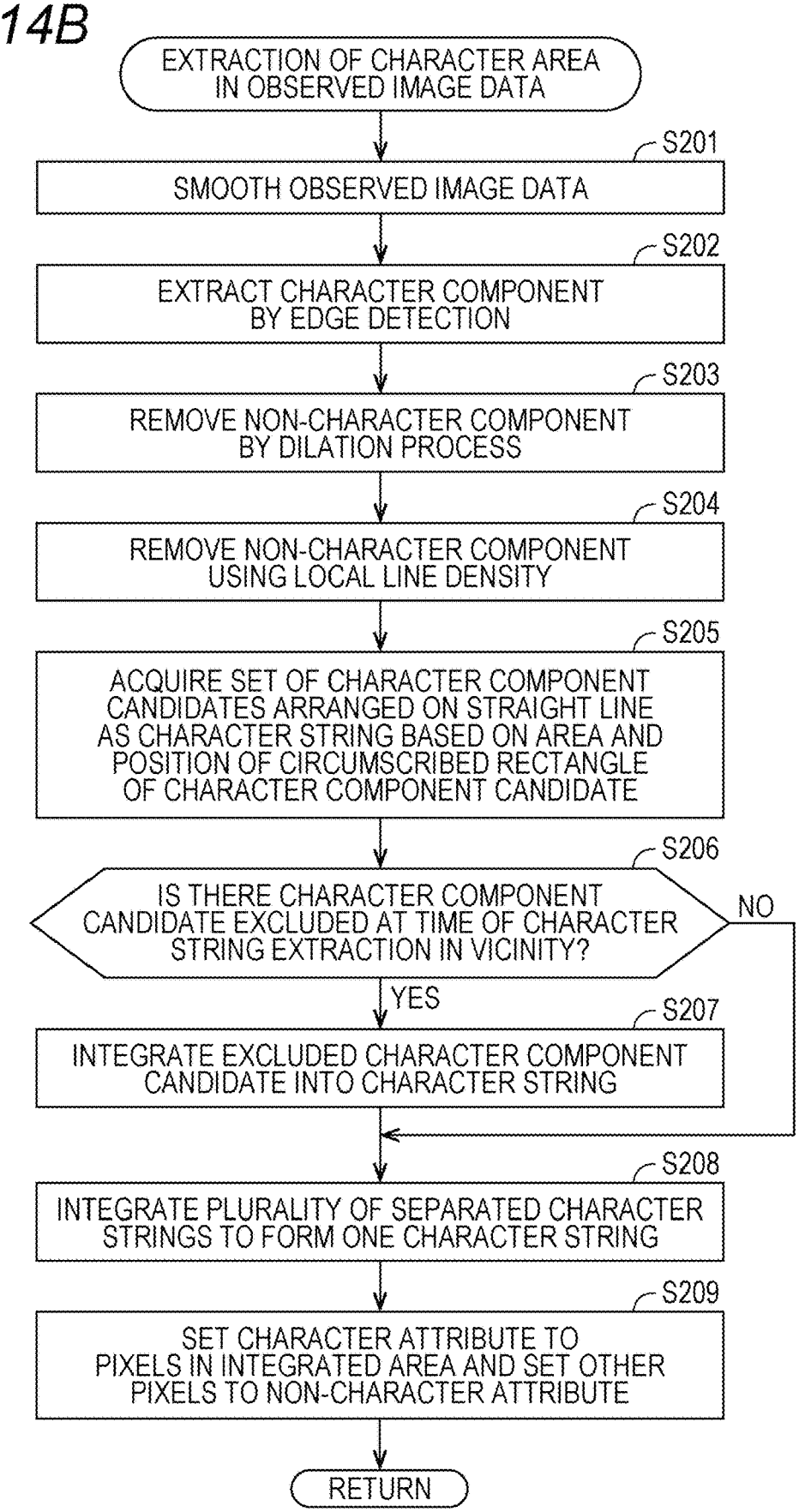
FIG. 14B is a flowchart illustrating the details of a character area extraction procedure in step S151.

The flowchart of FIG. 14B illustrates the details of the character area extraction procedure in step S151 in FIG. 14A.

In step S201, smoothing, which is preprocessing, is performed on the observed image data in the first image memory 3010. As a smoothing method, weighted median filter based anisotropic diffusion (WMFAD) for weighting a change in RGB values in four directions of upper, down, left, and right by a difference between values obtained by applying a median filter to brightness values is used. As a result, pixels have similar RGB values and are denoised.

Character component extraction by edge detection is performed on the smoothed observed image data (step S202). The edge detection is to extract a contour portion of an object based on a change in the brightness of an image. As a method of extracting an edge, a method such as a Sobel method, a Roberts method, a Laplacian method, or a Canny method is used.

Subsequently, a non-character component is removed by a dilation process (step S203). Specifically, after overlaps of connected components are removed, the basic operation Dilation of the morphology for a 5-pixel×5-pixel rectangular element is performed.

The non-character component is removed using a local line density (step S204). In this step, a method is used in which a character string is regarded as an area where short lines are densely arranged and the local line density is used as a feature amount. First, each connected component is extracted as an image from an edge image corresponding to a dilated image. Next, for each image, raster scanning is performed on pixels arranged on a two-dimensional plane for obtaining the local line density from the upper left to the lower right of the image, thereby converting the spatial local line density into a one-dimensional graph. Since the characters are distributed over the entire image, the graph of the local line density of the character component is a periodic and regular graph.

A set of character component candidates arranged on a straight line is acquired as a character string based on the area and position of the circumscribed rectangle of the character component candidate (step S205). Here, in the character string, characters with similar sizes are arranged on a straight line. Specifically, the character string is extracted based on the area or position of the circumscribed rectangle of the character component candidate. Next, it is checked whether there is a character component candidate excluded at the time of character string extraction in the vicinity (step S206), and if there is an excluded component, the character component candidate is integrated into the character string (step S207). After the excluded components are integrated, a plurality of separated character strings are integrated to form one character string (step S208). The circumscribed rectangle of the character string thus created is obtained, and this rectangular area is extracted as a character string area (step S209). In extracting the character string area, coordinate information of the character string area is output. The coordinate information of the character string area includes the vertex position, horizontal width and vertical width of the rectangular area in the coordinate system of the document. Based on the coordinate information, an area to be selected as the observed image data and an area to be selected as the mosaic image data are determined.

After the character area is extracted, it is determined in step S152 of FIG. 14A whether at least one character area is extracted from the observed image data. If no character area is extracted (No in step S152), the observed image data is selected (step S158), the mosaic image data is not generated, and then the processing of this flowchart is ended. If the character area is extracted (Yes in step S152), the area sensor 2000 is moved, the document is scanned to obtain pixel shift image data (step S153), and the processing in steps S154 to S157 is repeated for each of the pixels (step S154). Whether the pixel is a pixel in the character area is determined (step S155). If the pixel is a pixel in the character area (Yes in step S155), in accordance with the subroutine in FIG. 11, the pixels of the 600 dpi×600 dpi observed image data and the pixels of 600 dpi×600 dpi pixel shift image data are rearranged to obtain pixels of the 1200 dpi×1200 dpi mosaic image data (step S156). In this way, the character area is selected as the second image data, that is, the observed image data.

If the pixel is not a pixel in the character area (No in step S152), the R value, G value, and B value of one pixel of the 600 dpi×600 dpi observed image data are set as the R value, G value, and B value of the pixels in 2 rows×2 columns of the 1200 dpi×1200 dpi mosaic image data (step S157). In this way, the non-character area is selected as the first image data, that is, the observed image data.

Figure 15:
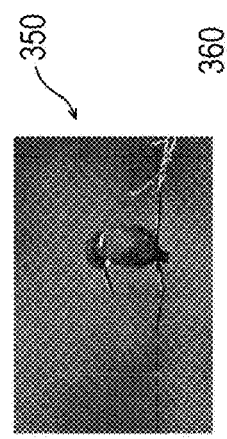
FIG. 15 shows an example of a document from which characters are extracted.

In a case where the document illustrated in FIG. 15 is read and 600 dpi×600 dpi observed image data is obtained, character strings 311, 312, 321, 322, 323, 324, 325, 361, 362, and 363 are obtained in FIG. 15 by the processing in steps S205 to S209. By integrating these character strings, character areas 310, 320, and 360 are obtained. Pixels belonging to these character areas are subjected to rearrangement and interpolation in step S156 in FIG. 14A.

[12] Summary

As described above, according to the present embodiment, one minute portion obtained by dividing the document is divided with a resolution of 1200 dpi×1200 dpi is represented by the G value of the observed image data and the R value or the B value of the pixel shift image data. Therefore, the same minute portion can be expressed more finely than 600 dpi×600 dpi image data in which light receiving elements in 2 rows×2 columns in the Bayer arrangement are one pixel. As a result, the image quality of image data can be improved.

Furthermore, when the mosaic image data is generated, the observed image data is generated based on the mosaic image data, and how much data size the mosaic image data occupies is presented to the user. Therefore, the user can understand the disadvantage of using the mosaic image data to some extent, and then use the mosaic image data for transmission. As a result, it is possible to avoid inconvenience caused by an excessive increase in the data size of the mosaic image data, and inconvenience when the mosaic image data is transmitted to a destination or used for editing.

Furthermore, in a case where the user sets the document image quality mode to the photograph mode, steps S110 to S117 in FIG. 10 are skipped and the processing subsequent to scanning after shifting the area sensor 2000 is omitted, so that the 600 dpi×600 dpi observed image data can be acquired early.

In a case where the user sets the document image quality mode to the character/photograph mode, only the character area extracted from the image data is combined with the pixel shift image data, and thus, a portion in which the processing of reading/combining and interpolating/writing the pixel data is performed corresponds to a part of the document. After the second reading is automatically performed, a user's selection may be received, and the image data selected by the user out of the 600 dpi×600 dpi image data and the 1200 dpi×1200 dpi image data may be output to the image processing circuit 3060.

[13] Second Embodiment

Figure 16A:
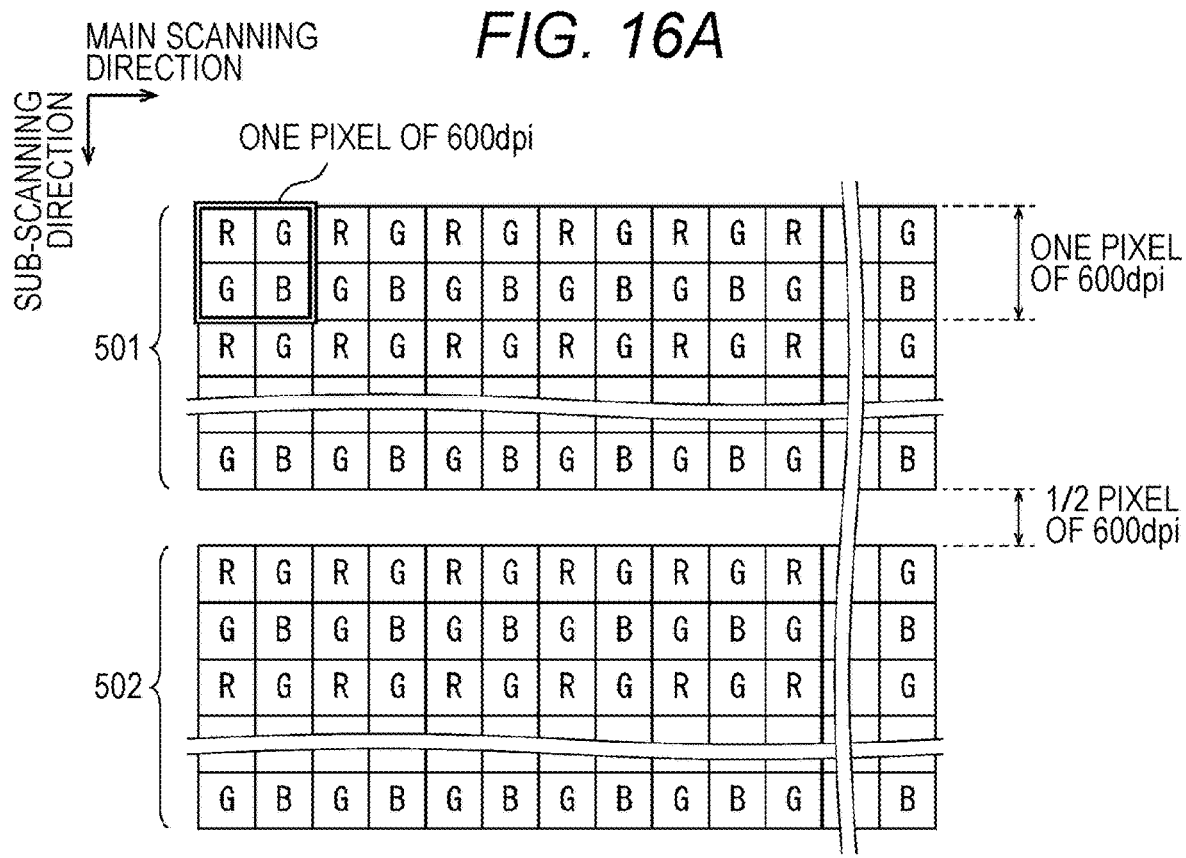
FIG. 16A is a plan view illustrating color filter configurations of a first area and a second area of the area sensor.

In a second embodiment, the area sensor 2000 is not shifted. Instead, the area sensor 2000 includes a first area 501 and a second area 502 as illustrated in FIG. 16A, and is configured to obtain observed image data in the first area 501 and pixel shift image data in the second area in the first read operation.

The first area 501 and the second area 502 have a plurality of light receiving elements arranged in the row direction and the column direction, and individually include a color filter with the same Bayer arrangement.

The difference between the first area 501 and the second area 502 is the color arrangement of the Bayer arrangement. In the main scanning direction, one color in the first area 501 is arranged so as to correspond to another color in the second area 502.

The first area 501 and the second area 502 are arranged in the sub-scanning direction, and there is a blank area corresponding to an odd multiple of ½ pixel of 600 dpi (one pixel of 1200 dpi), which is the inter-color pitch, between the first area 501 and the second area 502. Due to the presence of this blank area, color arrangement is performed in such a manner that one color in the first area 501 corresponds to another color in the second area 502.

The area sensor 2000 reads the entire document D in the first area 501 and also reads the entire document D in the second area 502. As illustrated in FIGS. 17A to 17C, the first area 501 reads the document D in the order of an area 601, an area 603, and an area 605 in the sub-scanning direction. The areas 601, 603, and 605 are in contact with each other in the sub-scanning direction.

The second area 502 sequentially reads the document D in the order of areas 602 and 604 in the sub-scanning direction.

The areas 602 and 604 are also in contact with each other in the sub-scanning direction. Since the first area 501 and the second area 502 are separated from each other by ½ pixel of 600 dpi (one pixel of 1200 dpi) in the sub-scanning direction, the areas 601 and 602 are shifted from each other by ½ pixel of 600 dpi (one pixel of 1200 dpi) in the sub-scanning direction, and similarly, the areas 603 and 604 are also shifted from each other by ½ pixel of 600 dpi (one pixel of 1200 dpi) in the sub-scanning direction.

The size of the areas 601 to 605 in the sub-scanning direction matches the size of the first area 501 and the second area 502 in the sub-scanning direction.

Figure 16B:
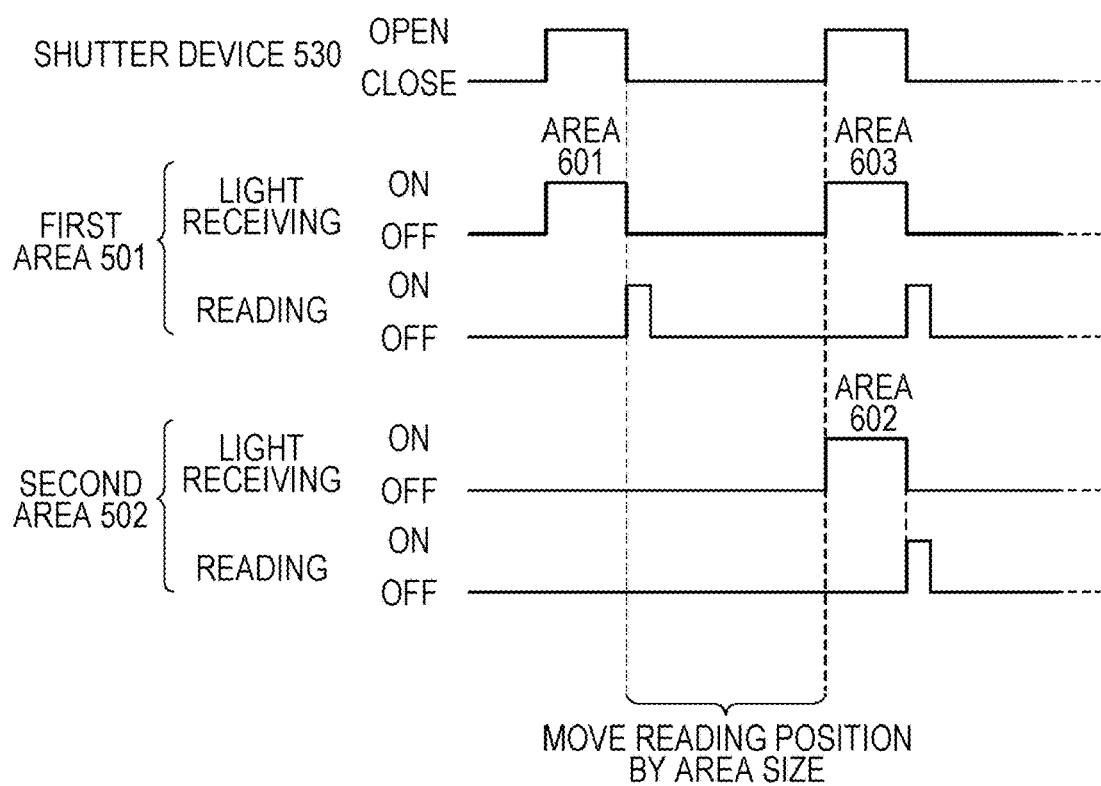
FIG. 16B is a timing chart for explaining a read timing of the first area and the second area.

When the document D is read, as illustrated in FIG. 16B, the first area 501 receives the reflected light from the area 601 when the shutter device 430 is "opened", and the amount of received light is read when the shutter device 430 is subsequently "closed".

When the shutter device 430 is "opened" for the second time, the reading area of the document D by the first area 501 is the area 603. The first area 501 receives the reflected light from the area 603 when the shutter device 430 is "opened", and the amount of received light is read when the shutter device 430 is "closed".

When the shutter device 430 is "opened" for the second time, the second area 502 receives the reflected light from the area 602 shifted from the area 601 by ½ pixel of 600 dpi (one pixel of 1200 dpi), and the amount of received light is read when the shutter device 430 is subsequently "closed".

Similarly, when the shutter device 430 is "opened" for the third time, the reading area of the document D by the first area 501 is the area 605, and the first area 501 receives the reflected light from the area 605 when the shutter device 430 is "opened". In addition, the second area 502 receives the reflected light from the area 604 shifted from the area 603 by ½ pixel of 600 dpi (one pixel of 1200 dpi). Then, when the shutter device 430 is subsequently "closed", the amount of received light is read from both the first area 501 and the second area 502.

In this manner, each of the first area 501 and the second area 502 reads the entire document D.

[14] Conversion of Image Data

Next, the read data of the first area 501 and the read data of the second area 502 are converted into 1200 dpi×1200 dpi image data.

Figure 18A:
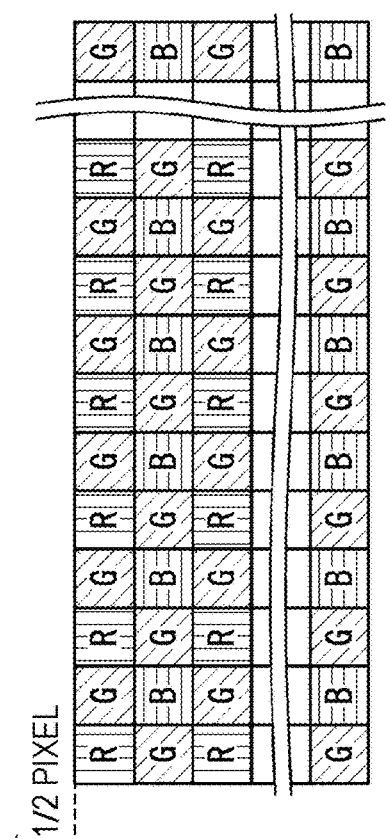
FIG. 18A is a diagram illustrating a reading position and a read color in the first area.
Figure 18B:
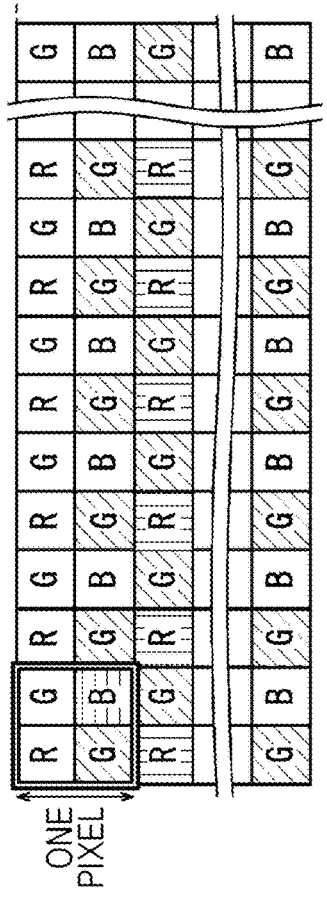
FIG. 18B is a diagram illustrating a reading position and a read color in the second area in relation to FIG. 18A.
Figure 19:
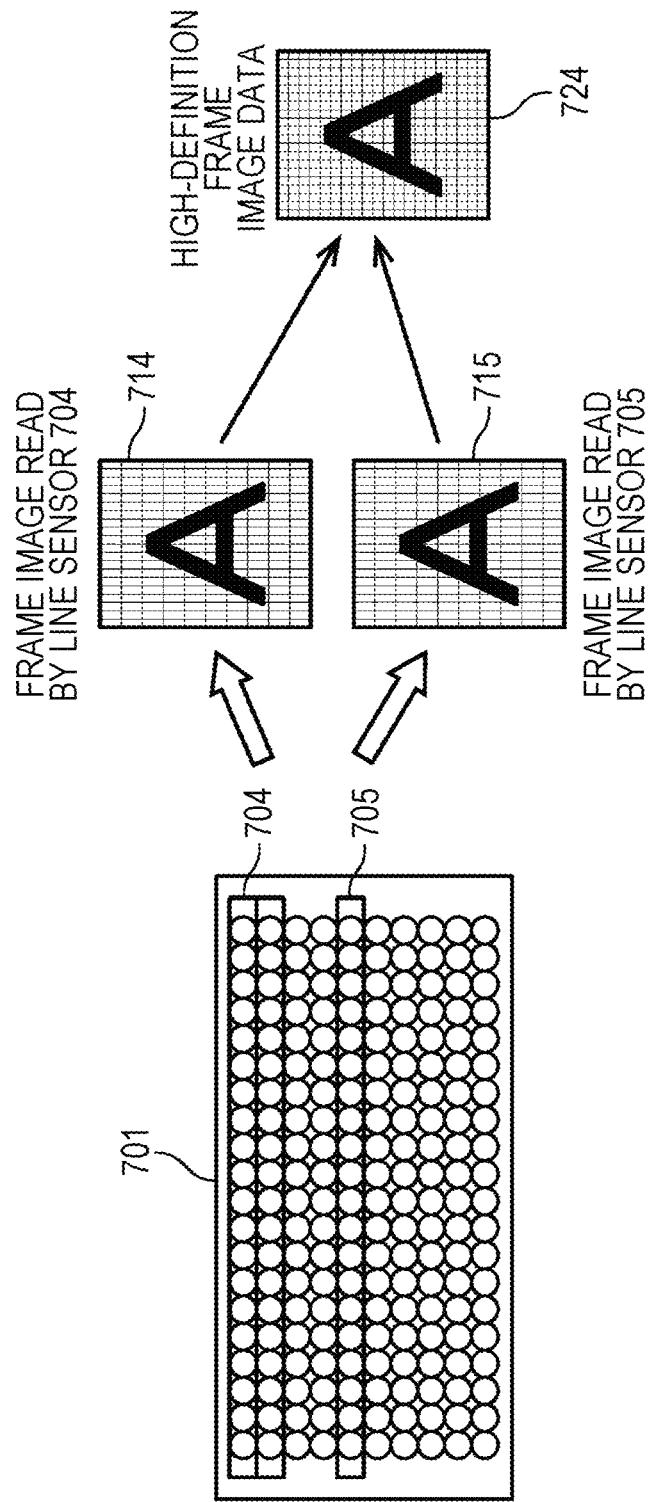
FIG. 19 illustrates the area sensor described in JP 2009-171563 A.

FIG. 18A is a diagram for explaining the reading position and the read color of the first area 501, and FIG. 18B is a diagram for explaining the reading position and the read color of the second area 502. Since the reading position of the first area 501 and the reading position of the second area 502 are shifted from each other by ½ pixel of 600 dpi (one pixel of 1200 dpi) and the arrangement of colors in the Bayer arrangement is different between the first area 501 and the second area 502, the second area 502 reads G at the position where R or B is read using the first area 501 on the document D.

Therefore, when G is extracted from the reading data of the first area 501 and the reading data of the second area 502 and these colors are combined, G image data with a resolution of 1200 dpi×1200 dpi in both the main scanning direction and the sub-scanning direction can be obtained as illustrated in FIG. 18C.

For the position where G is read using the first area 501, R or B is read in the second area 502. The position where R is read in the main scanning direction is the same for the first area 501 and the second area 502. Therefore, when R is extracted from the reading data of the first area 501 and the reading data of the second area 502 and these colors are combined, R image data of 600 dpi in the main scanning direction and 1200 dpi in the sub-scanning direction can be obtained as illustrated in FIG. 18C.

Since the position where B is read is also the same for the first area 501 and the second area 502, similarly to R, by combining the B reading data of the first area 501 and the second area 502, B image data of 600 dpi in the main scanning direction and 1200 dpi in the sub-scanning direction can be obtained as illustrated in FIG. 18C.

[15] Modifications

Although the present disclosure has been described based on the embodiments, it is needless to say that the present disclosure is not limited to the above embodiments, and the following modifications can be implemented.

(1) The movement unit 1000 shifts the area sensor 2000 in the sub-scanning direction, but it is not limited thereto. The movement unit may shift the area sensor in the main scanning direction.

(2) In the first embodiment, the document type is the character mode, the photograph mode, or the character/photograph mode, but it is not limited thereto. Other document types may be set in advance, and mosaic image data may be generated accordingly. For example, the document type may require high definition of a map, high definition of a face, high definition of a pictorial pattern, and high definition of a pattern. In addition, although automatic discrimination is performed in the character/photograph mode, it is not limited thereto. Although the character area has 1200 dpi, the area of a line drawing or a dot pattern may be high image quality data of 1200 dpi instead of or together with characters. Furthermore, although steps S151 to S158 are performed by user designation of the character/photograph mode, it is not limited thereto. In a case where there is no user designation, the character area and the photograph area may be automatically discriminated, and the processing of steps S151 to S138 may be performed based on the result.

(3) The arrangement of windows of the individual colors in the Bayer arrangement is not limited as long as two G windows are arranged at diagonal positions. Therefore, the arrangement of the windows of the individual colors in the square array of each pixel includes the arrangement illustrated in FIG. 5 and the arrangement in which the positions of R and B in the arrangement are exchanged. Furthermore, two types of arrangements in which the diagonal positions of G are different from those in the example of FIG. 5 and the positions of R and B are different are also conceivable.

Therefore, a total four types of square arrays can be obtained. In addition, the arrangement of the windows of the individual colors in the square array is the same for all the pixels of the color filter 410.

(4) In the first embodiment, the mosaic image data is obtained from the observed image data obtained by the first reading and the pixel shift image data obtained by the second reading, but it is not limited thereto. 600 dpi×600 dpi observed image data and 1200 dpi×1200 dpi mosaic image data may be generated by the first reading. In a case where a monochrome document in which black characters are written on a white background is read, the reflected light from a white background area passes through R, G, and B windows of a color filter. On the other hand, the reflected light from a black character area does not pass through the R, G, and B windows. Therefore, even in a case where the amounts of received light detected by light receiving elements in 2 rows×2 columns are binarized only by the first reading to obtain the color value of pixels in 2 rows×2 columns, it is possible to generate observed image data in which the content of the document is reproduced. As a result, in the case of reading a monochrome document, the second document reading may not be performed, and both the 600 dpi×600 dpi observed image data and the 1200 dpi×1200 dpi image data may be generated only by the first reading.

(5) Not limited to the designated number of colors, structural analysis may be performed on 600 dpi×600 dpi observed image data read without pixel movement, and the attribute of an area may be determined on the basis of the result of the structural analysis.

In parsing, document analysis is performed by a top-down approach and a bottom-up approach, and the inside of a band area is divided into a plurality of areas.

In the top-down approach, the structure of document data is made clear by binarizing the band area to create a projection histogram on the X-axis and a projection histogram on the Y-axis, and determining a portion of continuous base pixels with a certain length or more as a boundary area between adjacent character strings.

In the bottom-up approach, the band area is binarized, and pixel connection in which black pixels are connected in the binarized image is performed to obtain connected components. A circumscribed rectangle circumscribing the black pixel connected components is obtained. Thereafter, the smoothing of the black pixel connected components, the association between the feature points of the black pixel connected components, and the combination of the black pixel components based on the similarity are repeated to form a document area.

(6) In the second embodiment, the multi-function peripheral has been described as an example, but it is needless to say that the present disclosure is not limited to this, and similar effects can be obtained by applying the present disclosure to a scanner device, a copy device having a print function added thereto, and a facsimile device having a facsimile communication function added thereto.

The present invention is likely to be used in industrial fields of various types of industries such as the retail industry, rental industry, real estate industry, advertising industry, transportation industry, and publishing industry, as well as industrial fields of OA equipment and information equipment.

Although embodiments of the present invention have been described and illustrated in detail, the disclosed embodiments are made for purposes of illustration and example only and not limitation. The scope of the present invention should be interpreted by terms of the appended claims

What is claimed is:

1. An image reading apparatus comprising:
   a reader that performs first reading of reading a document and second reading of reading a portion read through a first color in the first reading through a second color using an area sensor having a Bayer arrangement color filter;
   a generator that generates first image data represented by a plurality of adjacent pixels with a read value obtained through one Bayer arrangement in the first reading as one pixel, and generates second image data using, for each reading position, a value read through the first color in the first reading and a value read through the second color in the second reading; and
   a selector that selects one of the first image data or the second image data.

2. The image reading apparatus according to claim 1, wherein the reader performs first reading and second reading on condition that a type of a document set by an operation is a specific type, the generator generates second image data, and the selector selects one of first image data or the second image data.

3. The image reading apparatus according to claim 2, wherein when a type of a document set by an operation is not a specific type, before the reader performs first reading, the selector selects first image data and the reader does not perform second reading.

4. The image reading apparatus according to claim 3, wherein the specific type of a document is a character document, and a type of a document that is not the specific type is a photographic document.

5. The image reading apparatus according to claim 1, further comprising an extractor that extracts a character area in the document by performing character extraction processing on a read value obtained by first reading after the reader performs the first reading and before the reader performs second reading.

6. The image reading apparatus according to claim 5, wherein the selector selects second image data for a character area extracted by an extractor, and selects first image data for an area other than the character area in a document.

7. The image reading apparatus according to claim 6, wherein the extractor detects a position of a character area in a document when performing character extraction processing, and
   the generator generates second image data by representing, as one pixel data, a read value read by first reading from a portion at a detected position and a read value read by second reading from the portion at the detected position.

8. The image reading apparatus according to claim 5, wherein the extractor performs the extraction in a case where a document type is set to a document of character/photograph.

9. The image reading apparatus according to claim 1, further comprising a presenter that presents first image data and second image data generated by the generator to a user in a case where a type of a document set by an operation is a specific type, wherein
   the selector selects one of the first image data or the second image data based on a user operation on a presentation of the first image data and the second image data.

10. The image reading apparatus according to claim 1, further comprising a mover that moves the area sensor in a main scanning direction or a sub-scanning direction from a first reading position to a second reading position by an odd multiple of an inter-color pitch of a Bayer arrangement, wherein
    the reader performs both first reading and second reading while relatively moving a document and the area sensor, and
    the mover performs the movement after the first reading and before the second reading.

11. The image reading apparatus according to claim 1, wherein
    the area sensor includes a first light receiving area and a second light receiving area,
    first reading is performed using the first light receiving area and second reading is performed using the second light receiving area,
    the color filter is disposed in a manner that a first color in the first light receiving area and a second color in the second light receiving area are at a same position in the main scanning direction, and the first reading using the first light receiving area and the second reading using the second light receiving area are performed while the document and the area sensor are relatively moved.

12. The image reading apparatus according to claim 1, wherein
the second reading includes
reading a portion read through G in first reading through R or B, and
reading a portion read through R or B in the first reading through G.

13. The image reading apparatus according to claim 1, wherein
for the portion whose value is read through G in the first reading and through R or B in the second reading, an interpolated value is calculated based on a value read through one remaining color, the value being read from another portion.

14. The image reading apparatus according to claim 1, wherein
for the portion whose value is read through R or B in the first reading and through G in the second reading, an interpolated value is calculated based on a value read through one remaining color, the value being read from another portion.

15. An image reading method comprising:
performing first reading of reading a document and second reading of reading a portion read through a first color in the first reading through a second color using an area sensor having a Bayer arrangement color filter;
generating first image data represented by a plurality of adjacent pixels with a read value obtained through one Bayer arrangement in the first reading as one pixel, and generating second image data using, for each reading position, a value read through the first color in the first reading and a value read through the second color in the second reading; and
selecting one of the first image data or the second image data.

16. A non-transitory recording medium storing a computer readable image reading program causing a computer to perform:
performing first reading of reading a document and second reading of reading a portion read through a first color in the first reading through a second color using an area sensor having a Bayer arrangement color filter;
generating first image data represented by a plurality of adjacent pixels with a read value obtained through one Bayer arrangement in the first reading as one pixel, and generating second image data using, for each reading position, a value read through the first color in the first reading and a value read through the second color in the second reading; and
selecting one of the first image data or the second image data.

* * * * *